United States Patent
Mizutani et al.

(10) Patent No.: US 9,852,031 B2
(45) Date of Patent: Dec. 26, 2017

(54) COMPUTER SYSTEM AND METHOD OF IDENTIFYING A FAILURE

(71) Applicant: HITACHI, LTD., Tokyo (JP)

(72) Inventors: Izumi Mizutani, Tokyo (JP); Masafumi Kinoshita, Tokyo (JP); Naoki Haraguchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 73 days.

(21) Appl. No.: 14/893,247

(22) PCT Filed: May 23, 2014

(86) PCT No.: PCT/JP2014/063634
§ 371 (c)(1),
(2) Date: Nov. 23, 2015

(87) PCT Pub. No.: WO2014/192641
PCT Pub. Date: Dec. 4, 2014

(65) Prior Publication Data
US 2016/0085638 A1    Mar. 24, 2016

(30) Foreign Application Priority Data
May 27, 2013 (JP) .................................. 2013-110830

(51) Int. Cl.
*G06F 11/00*    (2006.01)
*G06F 11/14*    (2006.01)
(Continued)

(52) U.S. Cl.
CPC ...... *G06F 11/1469* (2013.01); *G06F 11/0709* (2013.01); *G06F 11/0766* (2013.01);
(Continued)

(58) Field of Classification Search
CPC ..... H04L 67/1095; H04L 51/22; H04L 12/58; H04L 43/04; G06F 9/546; G06F 11/1443;
(Continued)

(56) References Cited

U.S. PATENT DOCUMENTS 4,159,517 A    6/1979  Paradine et al.
8,239,458 B2 *  8/2012  Agarwal .............. G06Q 10/107
                                                    709/206
(Continued)

FOREIGN PATENT DOCUMENTS

JP          05-316166 A      11/1993
JP        2002-278853 A       9/2002
(Continued)

*Primary Examiner* — Jason Bryan
(74) *Attorney, Agent, or Firm* — Volpe & Koenig, P.C.

(57) ABSTRACT

A computer system for realizing increased speed of identifying extent of a failure in a messaging system, provided with: a first computer including a message receiving part, a first log output part, and a first memory part configured to store receiving log data; a second computer including a data store management part configured to manage a data store, a first search part configured to search a message that meets a given condition from among messages stored in the data store, a second log output part, and a second memory part configured to store data store log data; a third computer including a message sending part, a third log output part, and a third memory part configured to store sending log data; and a fourth computer including a monitoring part, a log collecting part, and a second search part configured to search for lost message.

14 Claims, 18 Drawing Sheets

(51) Int. Cl.
   *G06F 11/07*     (2006.01)
   *H04L 12/26*     (2006.01)
(52) U.S. Cl.
   CPC .......... *G06F 11/1451* (2013.01); *H04L 43/04* (2013.01); *G06F 2201/84* (2013.01)
(58) Field of Classification Search
   CPC ............. G06F 11/1469; G06F 11/0709; G06F 11/0766; G06F 11/1451; G06F 11/34; G06F 13/00
   See application file for complete search history.

(56) References Cited

U.S. PATENT DOCUMENTS

| | | | |
|---|---|---|---|
| 9,367,578 B2* | 6/2016 | Gole | G06F 17/30578 |
| 2003/0110224 A1* | 6/2003 | Cazier | G06Q 10/107 709/206 |
| 2004/0148327 A1 | 7/2004 | Satomi et al. | |
| 2004/0148389 A1 | 7/2004 | Satomi et al. | |
| 2007/0233789 A1* | 10/2007 | Agarwal | G06Q 10/107 709/206 |
| 2008/0177901 A1 | 7/2008 | Watanabe et al. | |
| 2012/0096467 A1 | 4/2012 | Inoue et al. | |

FOREIGN PATENT DOCUMENTS

| | | |
|---|---|---|
| JP | 2004-227360 A | 8/2004 |
| JP | 2007-257288 A | 10/2007 |
| JP | 2008-181299 A | 8/2008 |
| JP | 2012-088815 A | 5/2012 |

* cited by examiner

RECEIVING LOG DATA

| | |
|---|---|
| 2013/03/01 00:00:01 1123522000542 | BUSINESS NOTICE |
| 2013/03/01 00:00:02 1358221346522 | PLEASE SEND WRITTEN MATERIAL |
| 2013/03/01 00:00:05 4468221658422 | NOTICE OF CHANGE OF DATE FOR 3/2 REGULAR MEETING |
| 2013/03/01 00:00:10 5445874446522 | GOOD MORNING |
| 2013/03/01 00:00:11 0241449824641 | PLEASE KINDLY LET ME KNOW YOUR SCHEDULE (3/5 17:00-) |
| 2013/03/01 00:00:31 9851023482523 | TODAY'S SCHEDULE |
| 2013/03/01 00:00:41 1281026460266 | NOTICE OF YOUR INTERVIEW TIME |
| 2013/03/01 00:01:03 1068712035465 | [IMPORTANT] ABOUT SCHEDULED ROAD CONSTRUCTION |
| 2013/03/01 00:01:30 8965543887998 | PLAN FOR GW |
| 2013/03/01 00:02:01 2100240048710 | TEST |
| .. | |

SENDING LOG DATA ⤴552

2013/02/28 01:20:11 13323453454321 I'LL BE LATE
2013/02/28 09:53:31 15422444379436 ^_^
2013/02/28 14:11:25 31345986871325 I'LL BE HOME SOON
2013/02/28 15:34:14 36159481545632 ITEMS TO BE MODIFIED
2013/02/28 15:31:41 17385491855941 NOTICE
2013/02/28 17:50:31 54621378256744 INVITATION TO FLOWER-VIEWING PARTY
2013/02/28 18:44:41 98197854416417 TEST
2013/02/28 20:01:03 23241731566754 CONGRATULATIONS
2013/02/28 22:02:30 19874144452742 SLEEPY
2013/02/28 22:15:01 12452786896635
... ..

FIG. 6B

DATA STORE LOG DATA ⟋553

2013/03/01 00:00:08 11235220005420 BUSINESS NOTICE
2013/03/01 00:00:10 1358221346522 PLEASE SEND WRITTEN MATERIAL
2013/03/01 00:00:12 4468221658422 NOTICE OF CHANGE OF DATE FOR 3/2 REGULAR MEETING
2013/03/01 00:00:20 5445874446522 GOOD MORNING
2013/03/01 00:00:21 0241449824641 PLEASE KINDLY LET ME KNOW YOUR SCHEDULE (3/5 17:00-)
2013/03/01 00:00:35 5546875224977 TODAY'S SCHEDULE
2013/03/01 00:00:50 1561054700455 NOTICE OF YOUR INTERVIEW TIME
2013/03/01 00:01:10 9851023482523 [IMPORTANT] ABOUT SCHEDULED ROAD CONSTRUCTION
2013/03/01 00:01:45 1281026460266 PLAN FOR GW
2013/03/01 00:02:15 1068712035465 TEST
.. ..

FIG. 6C

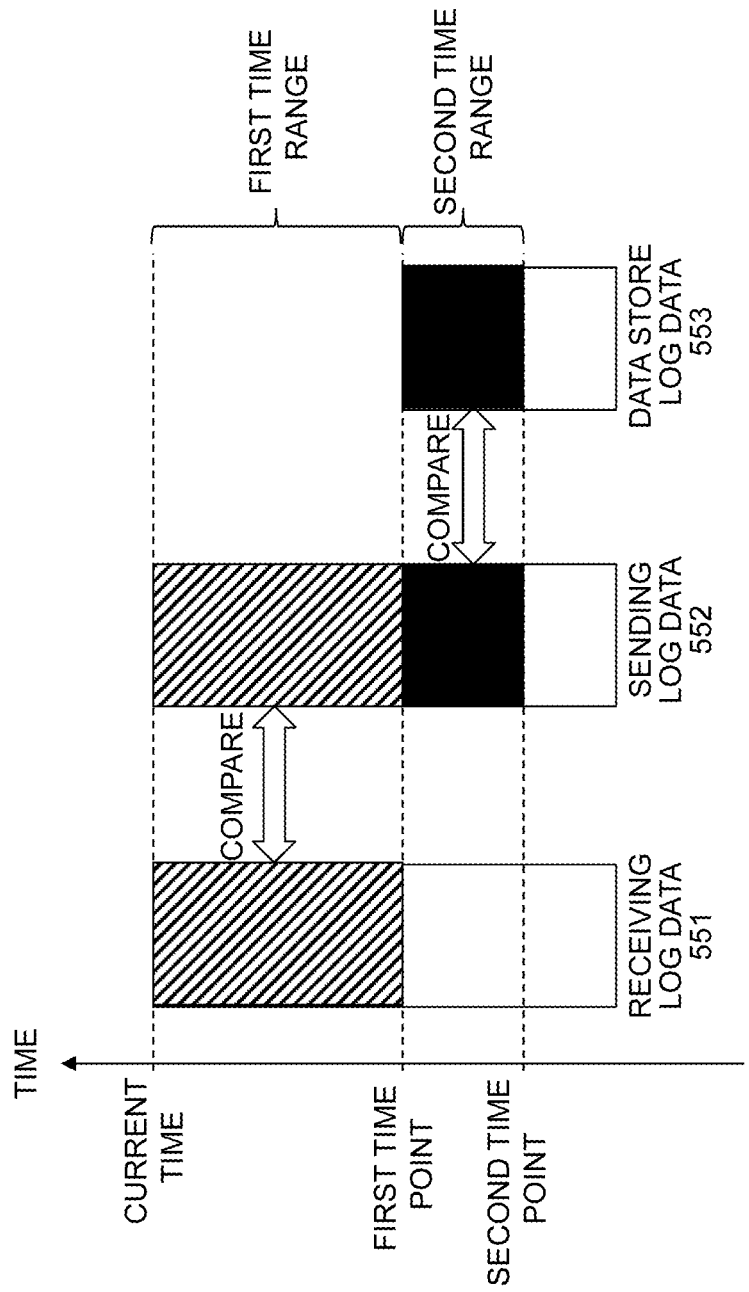

```
Terminal                                                          _ □ ✕

$ diff data_store.log send.log | grep "^>" | sed "s/^>//g" > output.log
$ cat output.log
2013/02/28 01:20:11 13323453454 21
2013/02/28 09:53:31 1542244379436
2013/02/28 14:11:25 3134598671325
2013/02/28 15:34:14 3615948154632
2013/02/28 15:31:41 1738549185941
2013/02/28 17:50:31 5462137825674
2013/02/28 18:44:41 9819785416417
2013/02/28 20:01:03 2324173156754
2013/02/28 22:02:30 1987414452742
2013/02/28 22:15:01 1245278689635

$ ./send_error_message output.log
———List of failures———
user11@test_domain.ne.jp   Re:
user12@test_domain.ne.jp   I'LL BE LATE
user13@test_domain.ne.jp   ^_^
user14@test_domain.ne.jp   I'LL BE HOME SOON
user15@test_domain.ne.jp   ITEMS TO BE MODIFIED
user16@test_domain.ne.jp   Re[2]:NOTICE
user17@test_domain.ne.jp   INVITATION TO FLOWER-VIEWING PARTY
user18@test_domain.ne.jp   Re:Re:Re:TEST
user19@test_domain.ne.jp   CONGRATULATIONS
user20@test_domain.ne.jp   SLEEPY Do you really send the error message? (Yes:y/No:n)
> y
Sending... done.
```

COMPUTER SYSTEM AND METHOD OF IDENTIFYING A FAILURE

INCORPORATION BY REFERENCE

The present application claims priority from Japanese patent application JP 2013-110830 filed on May 27, 2013, the content of which is hereby incorporated by reference into this application.

BACKGROUND

The subject matter disclosed herein relates to a system and method capable of identifying the extent of a failure quickly in a messaging system.

In recent years, a huge amount of data (big data) is sent/received over a network nowadays, and the importance of a messaging technology for processing big data efficiently is rising. With a common messaging technology, processing of relaying a message (for example, sensor data) to a destination server is executed by using a messaging system that includes a message receiving server, a message sending server, and backup storage where messages are stored.

The messaging system executes processing described below in the message relaying processing.

First, the receiving server receives a message from a sending terminal, stores the received message in the backup storage, and then sends a response to the sending terminal. Thereafter, the sending server obtains the message from the backup storage, relays the obtained message to a destination server, and then deletes the message from the backup storage.

By following the processing steps described above, a response to the sending terminal can be sent as soon as the storing of the message in the backup storage is finished, and the response performance is accordingly improved. Storing a message in the backup storage also guarantees the permanence of the stored message.

In recent years, messaging systems capable of processing a large amount of data efficiently and quickly by utilizing in-memory Key Value Store (KVS) are becoming popular.

In-memory KVS is a form of data store where data that is a pair of a key and a value is stored in a volatile memory. With in-memory KVS, high scalability is accomplished and, because data is stored on the memory, high processing performance is achieved as well. In-memory KVS is also capable of preventing data loss, which is a concern in an in-memory environment, through the replication (duplication) of data between a plurality of servers.

In the following description, processing of storing data that is a pair of a key and a value in a volatile memory is referred to as storing, processing of reading a value that is associated with a key out of the volatile memory is referred to as retrieval, and processing of erasing data that is a pair of a key and a value from the volatile memory is referred to as deletion.

In a messaging system that utilizes the in-memory KVS described above, data is managed on the in-memory (volatile memory) for quick processing, which has a possibility of complete data loss in the event of multiple failures. Further, when a data loss occurs, identifying the lost data is difficult because the receiving server, the sending server, and an in-memory KVS all handle different aspects of message processing from one another. The resulting problem is that grasping the extent of a failure (how many users have been affected by the message loss, how many messages have been lost, and the like) is difficult.

When a data loss occurs in a messaging system and a sending failure due to the data loss cannot be notified to the sender side, the failure is generally treated as a service failure. Accordingly, when dealing with a data loss by restoring lost data, or by identifying the extent of the failure and sending an error response to the sending terminal, is not possible in a messaging system that utilizes in-memory KVS, there is a chance of service failure, which makes the messaging system an unstable system.

A known method of preventing a service failure by restoring data is a technology described in U.S. Pat. No. 4,159,517 A.

The technology described in U.S. Pat. No. 4,159,517 A is commonly known as Write Ahead Logging (WAL), which is a DB technology. Write Ahead Logging is a technology used in in-memory DBs, typically, Hbase, and involves recording the specifics of processing in a non-volatile storage medium as a log when a piece of data is written so that the piece of data is restored by re-executing the processing recorded in the log. In Write Ahead Logging, each time the receiving server and the sending server execute processing that is related to in-memory KVS, the in-memory KVS records in a non-volatile storage medium a log of the processing including the specifics of the stored data. In the case where a failure occurs in the in-memory KVS, the in-memory KVS is reactivated, and the processing recorded in the log is executed to recover to the state that precedes the failure. By following these steps, the system can return to the state prior to data loss and Write Ahead Logging is thus capable of preventing a service failure due to data loss.

A known method of preventing a service failure by ensuring that the extent of a failure can be identified is a technology described in JP 2004-227360 A.

JP 2004-227360 A includes the following description: "Session information, which is assigned to each execution of processing in log information held by a server, is recorded in a session information management table, and a session information association relation between different pieces of log information is recorded in a session information association table. The session information association table is searched recursively for a piece of session information that is specified by a user through a display target entering part, to thereby identify a series of pieces of session information related to processing that is of interest to the user. For each piece of session information out of the series of related pieces of session information, an associated piece of information is collected from the log information. The collected pieces of information are integrated by the date of recording of the log and formatted so that it is easy to understand the flow of processing. The formatted information is then presented to the user."

SUMMARY

However, with the technology of U.S. Pat. No. 4,159,517 A, where a log is written in the in-memory KVS for each execution of processing and for every piece of data stored, the in-memory KVS performance drops and, consequently, the advantage of in-memory KVS which is fast processing is impaired.

The technology of JP 2004-227360 A needs to check hours of logs for all receiving servers and all sending servers, and takes long to identify the extent of a failure.

This invention has been made to solve the problems described above. Specifically, this invention provides a system and method capable of preventing a performance drop due to the writing of a log in an in-memory KVS, and capable of identifying the extent of a failure quickly.

The present invention can be appreciated by the description which follows in conjunction with the following figures, wherein: a computer system comprises a plurality of computers to be coupled to one another through a network, and is configured to receive a plurality of messages from a terminal and send each of the plurality of messages to a destination apparatus. Each of the plurality of computers includes a processor, a memory coupled to the processor, and a network interface coupled to the processor. The computer system comprises at least one first computer, at least one second computer, at least one third computer, and at least one fourth computer. The at least one first computer includes a message receiving part configured to receive the plurality of messages from the terminal, a first log output part configured to output a plurality of receiving logs which are logs of the received plurality of messages, and a first memory part configured to store receiving log data including the plurality of receiving logs. The at least one second computer including a data store management part configured to manage a data store which is built from a storage area of the memory and stores the plurality of messages, a first search part configured to search for at least one of the plurality of messages that meets a given condition from among the plurality of messages stored in the data store, a second log output part configured to output a data store log which is a log of the searched at least one of the plurality of messages, and a second memory part configured to store data store log data including a plurality of data store logs. The at least one third computer including a message sending part configured to retrieve the plurality of messages stored in the data store and send the plurality of messages to the destination apparatus, a third log output part configured to output a plurality of sending logs which are logs of the plurality of messages sent to the destination apparatus, and a third memory part configured to store sending log data including the plurality of sending logs. The at least one fourth computer including a first monitoring part configured to monitor a state of the data store, a first log collecting part configured to obtain the receiving log data from the first memory part, the data store log data from the second memory part, and the sending log data from the third memory part, respectively, in a case where a failure in the data store is detected, a second search part configured to search for at least one of the plurality of messages which has been lost due to the failure in the data store by comparing the obtained receiving log data, data store log data, and sending log data, and a fourth memory part configured to store the receiving log data, the data store log data, and the sending log data.

According to the aspect of this invention described above, only data store logs of messages that fulfill a given condition are written in the memory part, and a performance drop due to the writing of a log in the data store is thus prevented successfully. With only a small number of logs written, fast identification of the extent of a failure is accomplished as well.

According to the disclosure, a performance drop due to the writing of a log may be prevented. The extent of a failure may also be identified quickly.

Other objects, configurations, and effects than those described above are revealed through the following description of embodiments.

BRIEF DESCRIPTION OF THE DRAWINGS

The present invention can be appreciated by the description which follows in conjunction with the following figures, wherein:

FIG. 6A is an explanatory diagram for illustrating an example of the contents of receiving log data stored on the collection/search server in the first embodiment, FIG. 6B is an explanatory diagram for illustrating an example of the contents of sending log data stored on the collection/search server in the first embodiment, FIG. 6C is an explanatory diagram for illustrating an example of the contents of data store log data stored on the collection/search server in the first embodiment, FIG. 11 is an explanatory diagram for illustrating log data that is used by the collection/search server to identify the extent of a failure in the first embodiment, FIG. 12 is an explanatory diagram for illustrating an example of a terminal screen, which is used by the operator to operate the collection/search server of the first embodiment.

DETAILED DESCRIPTION OF THE EMBODIMENTS

Embodiments of this invention are described below with reference to the accompanying drawings.

The description of the embodiments uses a mail system, which is a typical messaging system.

First Embodiment

Figure 1:
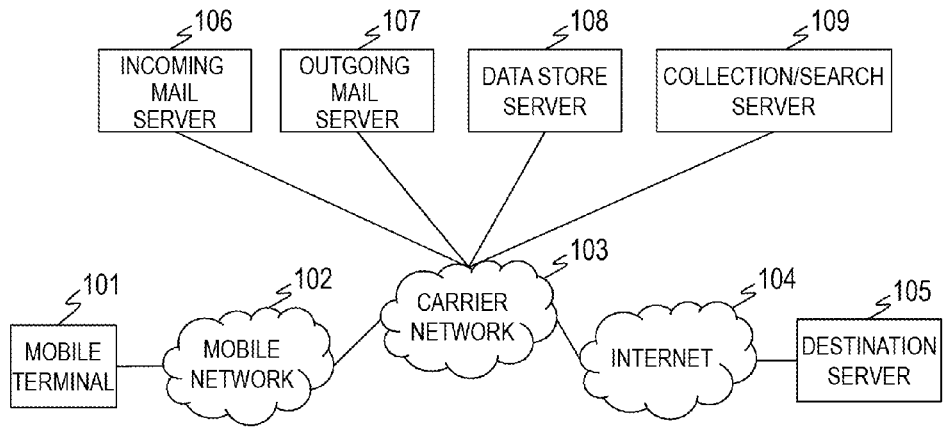
FIG. 1 is an explanatory diagram for illustrating an example of the configuration of a mail system according to a first embodiment of this invention.

FIG. 1 is an explanatory diagram for illustrating an example of the configuration of a mail system according to a first embodiment of this invention.

The mail system, namely, messaging system, of this embodiment includes a mobile terminal 101, a destination server 105, an incoming mail server 106, an outgoing mail server 107, a data store server 108, and a collection/search server 109. The mail system also includes, as networks that couple the constituent apparatus of the mail system, a mobile network 102, a carrier network 103, and an internet 104.

The mobile terminal 101 is a terminal handled by a user or other people, and is coupled to the carrier network 103 via the mobile network 102. The mobile network 102 is a wireless network that couples the mobile terminal 101 and the carrier network 103. The carrier network 103 is a network that couples the mobile network 102, the internet 104, the incoming mail server 106, the outgoing mail server 107, the data store server 108, and the collection/search server 109.

The destination server 105 is coupled to the carrier network 103 via the internet 104, and sends/receives mail to/from the outgoing mail server 107.

The incoming mail server 106 is coupled to the carrier network 103, receives mail sent from the mobile terminal 101 via the carrier network 103, and stores the mail on the data store server 108. While there is only one incoming mail server 106 in FIG. 1, the mail system may include a plurality of incoming mail servers 106.

The outgoing mail server 107 is coupled to the carrier network 103, retrieves mail from the data store server 108, and sends the mail to the destination server 105. While there is only one outgoing mail server 107 in FIG. 1, the mail system may include a plurality of outgoing mail servers 107.

The data store server 108 is coupled to the carrier network 103, and holds mail that is stored therein by the incoming mail server 106. The data store server 108 is a message store, typically an in-memory KVS. While there is only one data store server 108 in FIG. 1, the mail system may include a plurality of data store servers 108.

The collection/search server 109 is coupled to the carrier network 103, and monitors the situation of the data store server 108. The collection/search server 109 also collects logs that are on the incoming mail server 106, the outgoing mail server 107, and the data store server 108, and uses the collected logs to identify the extent of a failure.

The incoming mail server 106, the outgoing mail server 107, the data store server 108, and the collection/search server 109 are implemented as different apparatus in the example of FIG. 1. However, this embodiment is not limited thereto, and the functions of two or more of the servers may be implemented by a single apparatus. For example, a single apparatus may implement the functions of the incoming mail server 106 and the outgoing mail server 107. To give another example, a single apparatus may implement the functions of the incoming mail server 106, the outgoing mail server 107, the data store server 108, and the collection/search server 109.

Alternatively, the incoming mail server 106, the outgoing mail server 107, the data store server 108, and the collection/search server 109 may be implemented with the use of a virtualization technology. For example, virtual computers corresponding to the incoming mail server 106, the outgoing mail server 107, the data store server 108, and the collection/search server 109 may be generated on a single computer.

Figure 2:
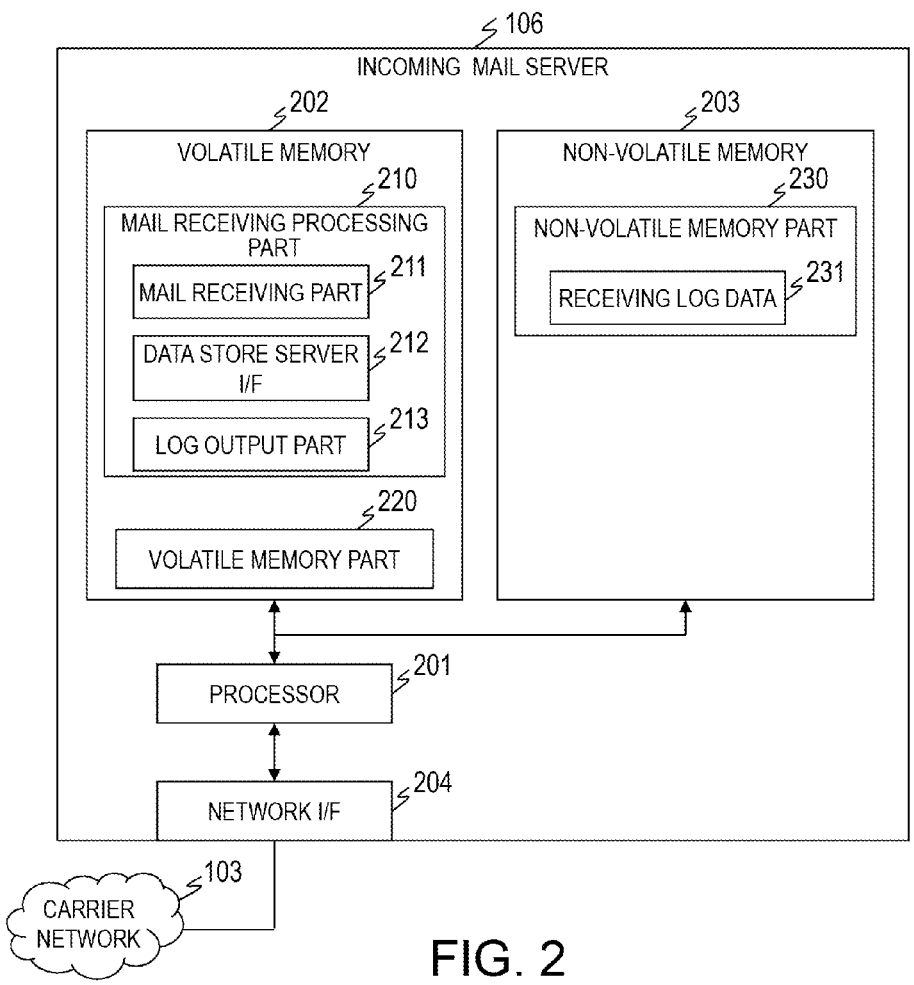
FIG. 2 is a block diagram for illustrating an example of the configuration of an incoming mail server in the first embodiment.

FIG. 2 is a block diagram for illustrating an example of the configuration of the incoming mail server 106 in the first embodiment.

The incoming mail server 106 is implemented with the use of an information processing apparatus. The hardware configuration of the incoming mail server 106 includes a processor 201, a volatile memory 202, a non-volatile memory 203, and a network I/F 204, which are coupled to one another via an internal communication line such as a bus.

The processor 201 executes a program stored in the volatile memory 202. By executing a program that is stored in the volatile memory 202 with the use of the processor 201, the function of the incoming mail server 106 is implemented. In the following description, a program described as performing processing is actually being executed by the processor 201.

The volatile memory 202 stores a program executed by the processor 201, and includes a storage area in which data necessary to execute the program is temporarily stored. Specifically, the volatile memory 202 stores a program that implements a mail receiving processing part 210, and includes a volatile memory part 220.

The mail receiving processing part 210 includes a plurality of program modules, and controls receiving processing for receiving mail from the mobile terminal 101. Specifically, the mail receiving processing part 210 includes a mail receiving part 211, a data store server I/F 212, and a log output part 213.

The mail receiving part 211 executes receiving processing for mail sent from the mobile terminal 101.

The data store server I/F 212 executes storing processing for storing received mail on the data store server 108.

The log output part 213 outputs, when received mail is stored on the data store server 108, a receiving log in a data format that includes information for identifying the stored mail. The output receiving log is stored in receiving log data 231 of a non-volatile memory part 230 in this embodiment.

The mail receiving part 211 may include the function of the data store server I/F 212.

The volatile memory part 220 stores data that is managed by the mail receiving processing part 210.

The non-volatile memory 203 includes the non-volatile memory part 230 in which data is to be stored permanently.

The non-volatile memory part 230 stores data that is managed by the mail receiving processing part 210, and also stores the receiving log data 231. The receiving log data 231 is data that includes one or more receiving logs output by the log output part 213.

The network I/F 204 is an interface for coupling to other apparatus via a network. The network I/F 204 in this embodiment is coupled to the carrier network 103.

The program stored in the volatile memory 202 may instead be stored in the non-volatile memory 203. The processor 201 in this case reads the program out of the non-volatile memory 203, and loads the read program onto the volatile memory 202.

Figure 3:
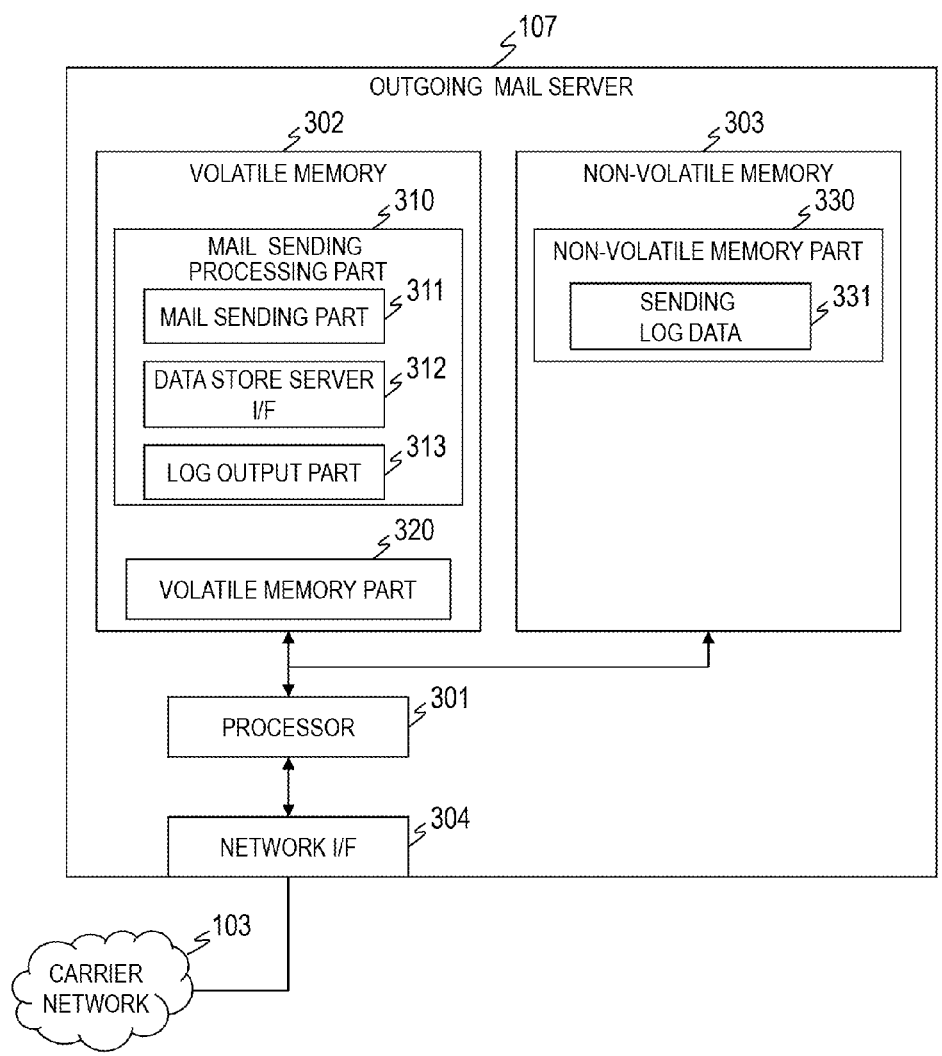
FIG. 3 is a block diagram for illustrating an example of the configuration of an outgoing mail server in the first embodiment.

FIG. 3 is a block diagram for illustrating an example of the configuration of the outgoing mail server 107 in the first embodiment.

The outgoing mail server 107 is implemented with the use of an information processing apparatus. The hardware configuration of the outgoing mail server 107 includes a processor 301, a volatile memory 302, a non-volatile memory 303, and a network I/F 304, which are coupled to one another via an internal communication line such as a bus.

The processor 301 executes a program stored in the volatile memory 302. By executing a program that is stored in the volatile memory 302 with the use of the processor 301, the function of the outgoing mail server 107 is implemented. In the following description, a program described as performing processing is actually being executed by the processor 301.

The volatile memory 302 stores a program executed by the processor 301, and includes a storage area in which data necessary to execute the program is temporarily stored. Specifically, the volatile memory 302 stores a program that implements a mail sending processing part 310, and includes a volatile memory part 320.

The mail sending processing part 310 includes a plurality of program modules, and controls sending processing for sending mail to the destination server 105. Specifically, the mail sending processing part 310 includes a mail sending part 311, a data store server I/F 312, and a log output part 313.

The mail sending part 311 executes sending processing for sending to the destination server 105 mail retrieved from the data store server 108.

The data store server I/F 312 executes retrieval processing for getting mail from the data store server 108.

The log output part 313 outputs, if send mail to the destination server 105 is completed, a sending log in a data format that includes information for identifying the sent mail. The output sending log is stored in sending log data 331 of a non-volatile memory part 330 in this embodiment.

The volatile memory part 320 stores data that is managed by the mail sending processing part 310.

The mail sending part 311 may include the function of the data store server I/F 312.

The non-volatile memory 303 includes the non-volatile memory part 330 in which data is stored permanently.

The non-volatile memory part 330 stores data that is managed by the mail sending processing part 310, and also stores the sending log data 331. The sending log data 331 is data that includes one or more sending logs output by the log output part 313.

The network I/F 304 is an interface for coupling to other apparatus via a network. The network I/F 304 in this embodiment is coupled to the carrier network 103.

The program stored in the volatile memory 302 may instead be stored in the non-volatile memory 303. The processor 301 in this case reads the program out of the non-volatile memory 303, and loads the read program onto the volatile memory 302.

Figure 4:
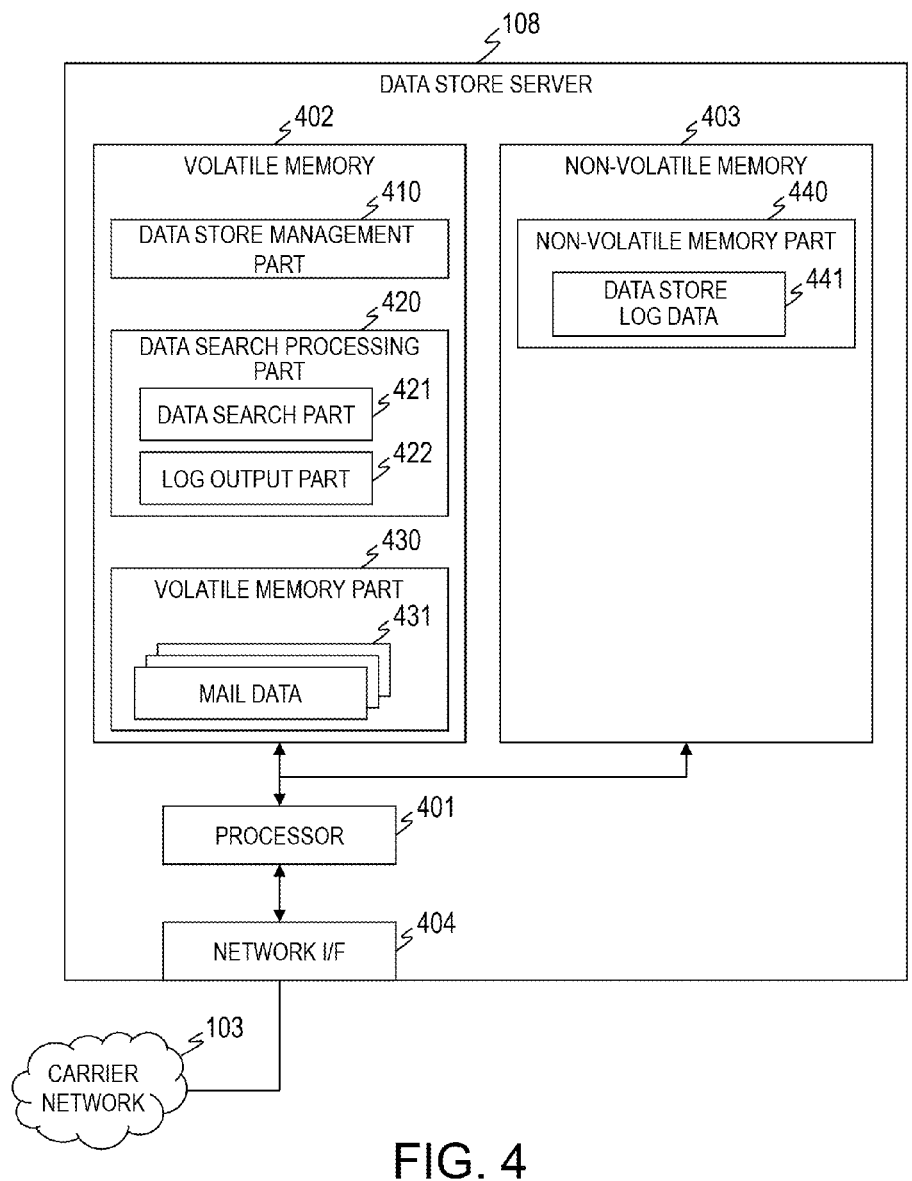
FIG. 4 is a block diagram for illustrating an example of the configuration of a data store server in the first embodiment.

FIG. 4 is a block diagram for illustrating an example of the configuration of the data store server 108 in the first embodiment.

The data store server 108 is implemented with the use of an information processing apparatus. The hardware configuration of the data store server 108 includes a processor 401, a volatile memory 402, a non-volatile memory 403, and a network I/F 404, which are coupled to one another via an internal communication line such as a bus.

The processor 401 executes a program stored in the volatile memory 402. By executing a program that is stored in the volatile memory 402 with the use of the processor 401, the function of the data store server 108 is implemented. In the following description, a program described as performing processing is actually being executed by the processor 401.

The volatile memory 402 stores programs executed by the processor 401, and includes a storage area in which data necessary to execute the programs is temporarily stored. Specifically, the volatile memory 402 stores programs that implement a data store management part 410 and a data search processing part 420, and includes a volatile memory part 430.

The data store management part 410 controls data store processing procedures. The data store processing procedures include processing for storing a pair of a key and a value that is received from the incoming mail server 106 or from the outgoing mail server 107 in the volatile memory part 430, processing for sending in response a value that is associated with a key received from the incoming mail server 106 or from the outgoing mail server 107, and processing for deleting a value that is associated with a key received from the incoming mail server 106 or from the outgoing mail server 107.

The data search processing part 420 includes a plurality of program modules, and controls processing for searching for mail data to be output as a data store log. Specifically, the data search processing part 420 includes a data search part 421 and a log output part 422.

The data search part 421 executes processing for searching pieces of mail data 431, which are stored in the volatile memory part 430, for a piece of the mail data 431 that fulfills a particular condition.

The log output part 422 outputs a data store log of a piece of the mail data 431 that is found through the search by the data search part 421. The output data store log is stored in data store log data 441 of the non-volatile memory part 440 in this embodiment.

The volatile memory part 430 stores data that is managed by the data store management part 410. The volatile memory part 430 of this embodiment stores one or more pieces of the mail data 431. The mail data 431 is data of mail stored by the data store management part 410. The data store management part 410 in this embodiment manages the mail data 431 (a value) with a sending time and date, a unique ID, a domain name, or the like that is included in the header or other sections of the mail data 431 as a key.

The non-volatile memory 403 includes the non-volatile memory part 440 in which data is stored permanently.

The non-volatile memory part 440 stores data that is managed by the data store management part 410 and the data search processing part 420. The non-volatile memory part 440 also stores the data store log data 441. The data store log data 441 is data that includes one or more data store logs output by the log output part 422.

The network I/F 404 is an interface for coupling to other apparatus via a network. The network I/F 404 in this embodiment is coupled to the carrier network 103.

The program stored in the volatile memory 402 may instead be stored in the non-volatile memory 403. The processor 401 in this case reads the program out of the non-volatile memory 403, and loads the read program onto the volatile memory 402.

Figure 5:
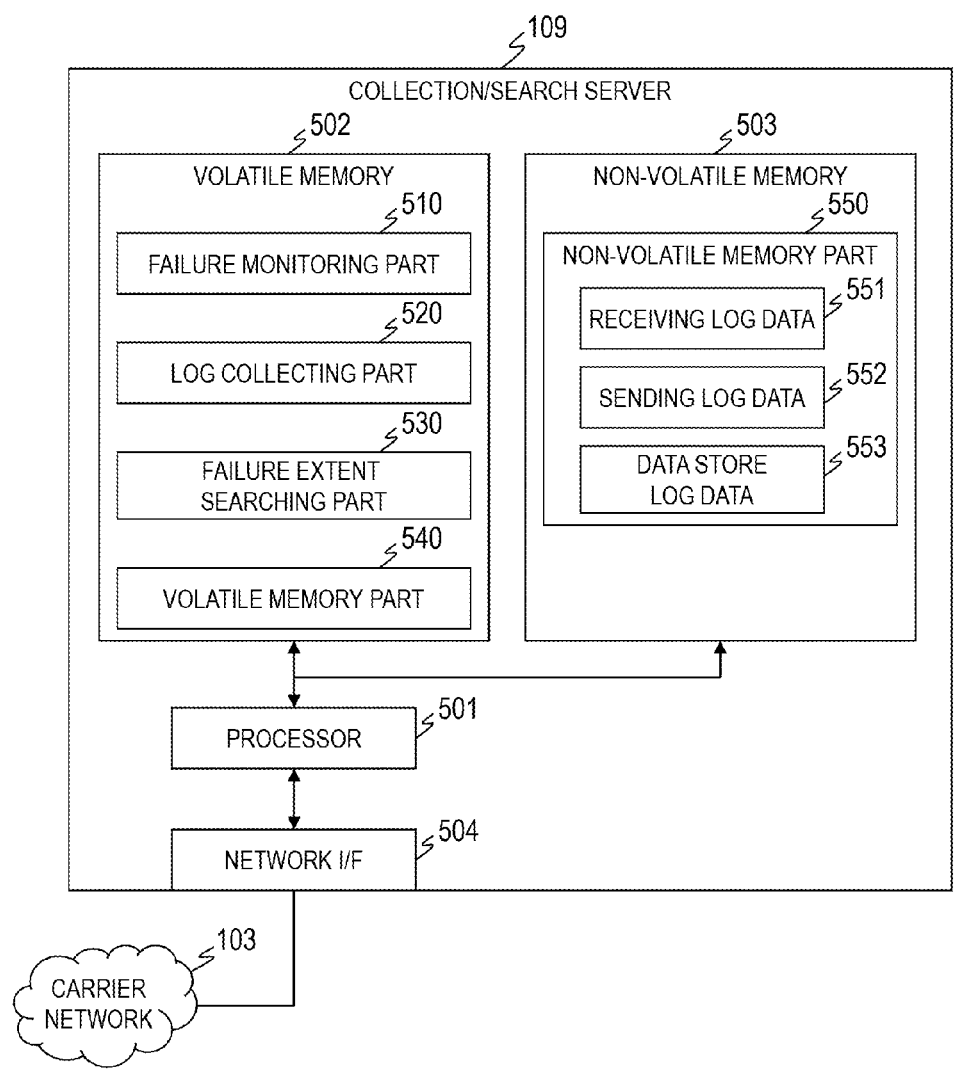
FIG. 5 is a block diagram for illustrating an example of the configuration of a collection/search server in the first embodiment.

FIG. 5 is a block diagram for illustrating an example of the configuration of the collection/search server 109 in the first embodiment.

The collection/search server 109 is implemented with the use of an information processing apparatus. The hardware configuration of the collection/search server 109 includes a processor 501, a volatile memory 502, a non-volatile memory 503, and a network I/F 504, which are coupled to one another via an internal communication line such as a bus.

The processor 501 executes a program stored in the volatile memory 502.

By executing a program that is stored in the volatile memory 502 with the use of the processor 501, the function of the collection/search server 109 is implemented. In the following description, a program described as performing processing is actually being executed by the processor 501.

The volatile memory 502 stores programs executed by the processor 501, and includes a storage area in which data necessary to execute the programs is temporarily stored.

Specifically, the volatile memory 502 stores programs that implement a failure monitoring part 510, a log collecting part 520, and a failure extent searching part 530, and includes a volatile memory part 540.

The failure monitoring part 510 executes processing for monitoring a failure in the data store server 108 or other components. Specifically, the failure monitoring part 510 determines whether or not a loss of the mail data 431 stored in the volatile memory part 430 of the data store server 108 has occurred.

The log collecting part 520 executes processing for obtaining logs from the respective servers and storing the obtained logs in the non-volatile memory 503. The log collecting part 520 in this embodiment obtains the receiving log data 231, which is stored in the non-volatile memory part 230 of the incoming mail server 106, the sending log data 331, which is stored in the non-volatile memory part 330 of the outgoing mail server 107, and the data store log data 441, which is stored in the non-volatile memory part 440 of the data store server 108. The log collecting part 520 stores the obtained logs in a non-volatile memory part 550 of the non-volatile memory 503 as receiving log data 551, sending log data 552, and data store log data 553, respectively.

The failure extent searching part 530 executes processing for identifying mail that has been lost due to a failure in the data store server 108, based on the receiving log data 551, the sending log data 552, and the data store log data 553, which are stored in the non-volatile memory part 550.

The volatile memory part 540 stores data that is managed by the failure monitoring part 510, the log collecting part 520, and the failure extent searching part 530.

The non-volatile memory 503 includes the non-volatile memory part 550 in which data is stored permanently.

The non-volatile memory part 550 stores data that is managed by the failure monitoring part 510, the log collecting part 520, and the failure extent searching part 530. The non-volatile memory part 550 also stores the receiving log data 551, the sending log data 552, and the data store log data 553.

The receiving log data 551 includes a plurality of receiving logs obtained by the log collecting part 520 from the incoming mail server 106. The sending log data 552 includes a plurality of sending logs obtained by the log collecting part 520 from the outgoing mail server 107. The data store log data 553 includes a plurality of data store logs obtained by the log collecting part 520 from the data store server 108.

The network I/F 504 is an interface for coupling to other apparatus via a network. The network I/F 504 in this embodiment is coupled to the carrier network 103.

The program stored in the volatile memory 502 may instead be stored in the non-volatile memory 503. The processor 501 in this case reads the program out of the non-volatile memory 503, and loads the read program onto the volatile memory 502.

FIG. 6A is an explanatory diagram for illustrating an example of the contents of the receiving log data 551 stored on the collection/search server 109 in the first embodiment. FIG. 6B is an explanatory diagram for illustrating an example of the contents of the sending log data 552 stored on the collection/search server 109 in the first embodiment. FIG. 6C is an explanatory diagram for illustrating an example of the contents of the data store log data 553 stored on the collection/search server 109 in the first embodiment.

A log stored in the receiving log data 551, a log stored in the sending log data 552, and a log stored in the data store log data 553 each include a plurality of pieces of data in a log format that includes time and date, a unique ID, the mail address of the sender, and the subject of the mail.

The unique ID is a value by which a piece of mail is always identified uniquely. By using a unique ID, the contents of mail that are included in the receiving log data 551, the sending log data 552, and the data store log data 553 can be associated with one another.

The logs are not limited to the log format described above, and, for example, may each include the body of the mail in addition to the items of the described log format. While this increases the load of processing at the time of outputting a log, in the case where mail data that has not been sent to the destination server 105 is lost due to a failure, the lost mail can be restored with the use of the mail body included in the log and the restored mail can be sent to the destination server 105.

The logs may include information about coping processing for dealing with a failure in addition to the items of the described log format. Examples of the information about coping processing include "send a delivery failure notification to the mobile terminal" and "restore mail and send the restored mail to the destination server". Flexible failure coping is accomplished by executing coping processing based on this information on the respective servers when a failure occurs.

The specifics of processing procedures in this embodiment are described next.

Figure 7:
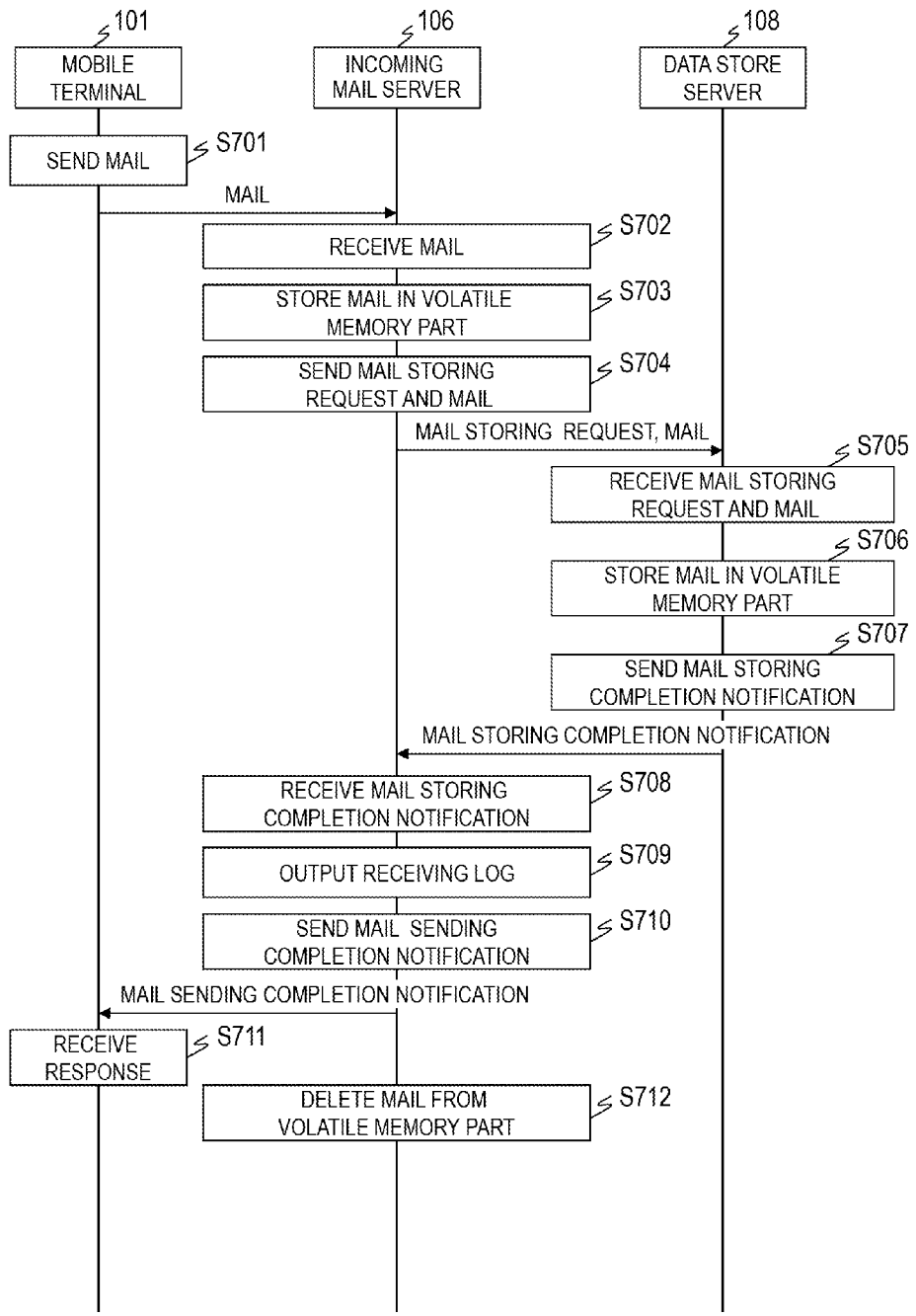
FIG. 7 is a sequence diagram for illustrating an example of mail receiving processing of the first embodiment.
Figure 8A:
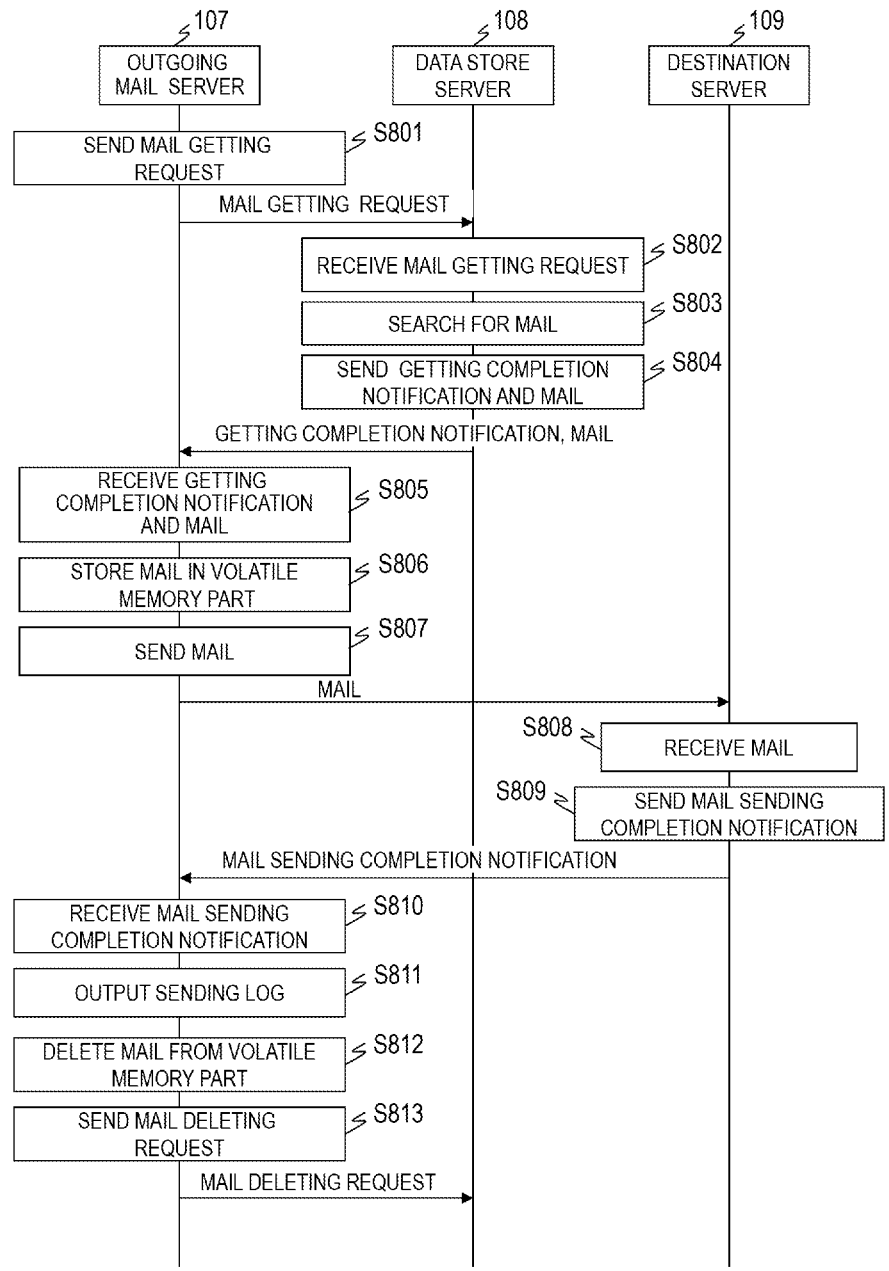
FIG. 8A and FIG. 8B are sequence diagrams for illustrating an example of mail sending processing of the first embodiment.
Figure 8B:
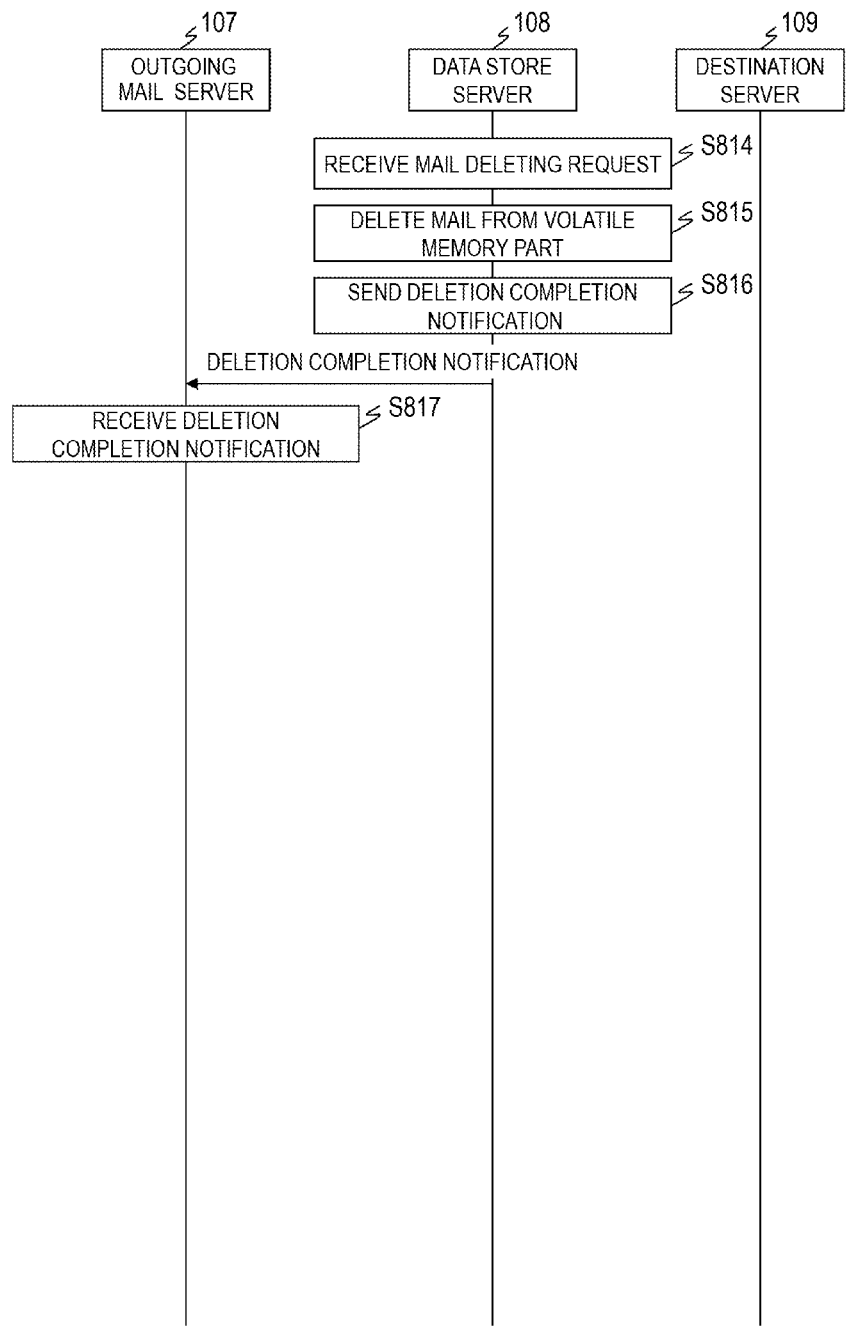

FIG. 7 is a diagram for illustrating processing that is executed when the incoming mail server 106 receives mail. FIG. 8A and FIG. 8B are diagrams for illustrating processing that is executed when the outgoing mail server 107 sends mail.

In mail sending and receiving processing, mail, various requests, and various notifications are sent/received between the data store server I/F 212 of the incoming mail server 106 and the data store server 108, or between the data store server I/F 312 of the outgoing mail server 107 and the data store server 108.

However, data that is actually sent/received between the incoming mail server 106 or the outgoing mail server 107 and the data store server 108 is in a data format that includes header information, a payload where the data main body is stored, or the like.

In the following description, mail, various requests, and various notifications that form the payload section of actually sent/received data are used instead of the data, in order to describe a sequence focused on mail receiving processing and mail sending processing.

The same applies to mail and various notifications that are sent/received between the mobile terminal 101 and the mail receiving part 211 of the incoming mail server 106, and mail and various notifications that are sent/received between the mail sending part 311 of the outgoing mail server 107 and the destination server 105.

When processing related to the storage, retrieval, or deletion of mail in/from the volatile memory part 430 of the data store server 108 is executed, various types of management information in addition to mail may need to be sent/received between the data store server I/F 212 of the incoming mail server 106 and the data store server 108, or between the data store server I/F 312 of the outgoing mail server 107 and the data store server 108.

In the following description, however, processing related to the storage, retrieval, or deletion of mail is described in the form of one request-one response by omitting a description about the sending/receiving of the management information, in order to describe a sequence focused on mail receiving processing and mail sending processing.

FIG. 7 is a sequence diagram for illustrating an example of mail receiving processing of the first embodiment.

First, the mobile terminal 101 sends mail to the incoming mail server 106 (Step S701).

The mail receiving part 211 of the incoming mail server 106 receives the mail sent from the mobile terminal 101 (Step S702), and stores the mail (mail data) in the volatile memory part 220 (Step S703).

The data store server I/F 212 of the incoming mail server 106 next sends a mail storing request and the mail to the data store server 108 (Step S704).

Though not shown in FIG. 7, in the case where the mail storing request and the mail are not received properly by the data store server 108 and the subsequent processing is not executed as a result, the incoming mail server 106 notifies the mobile terminal 101 that the mail has not been sent normally.

Next, the data store management part 410 of the data store server 108 receives the mail storing request and the mail (Step S705), and stores the received mail (the mail data 431) in the volatile memory part 430 as requested by the mail storing request (Step S706). After storing the mail (the mail data 431) in the volatile memory part 430, the data store management part 410 of the data store server 108 sends a mail storing completion notification to the incoming mail server 106 (Step S707).

Though not shown in FIG. 7, in the case where the storing of mail (the mail data 431) fails in Step S706, the data store management part 410 notifies the incoming mail server 106 that the mail (the mail data 431) has not been stored. Then, the incoming mail server 106 notifies the mobile terminal 101 that the mail has not been sent normally.

Next, the data store server I/F 212 of the incoming mail server 106 receives the mail storing completion notification (Step S708). The log output part 213 of the incoming mail server 106 output a receiving log in a data format that includes information for identifying the mail that has been sent to the data store server 108 (Step S709). The output receiving log is stored in the receiving log data 231 of the non-volatile memory part 230.

The mail receiving part 211 of the incoming mail server 106 next sends a mail sending completion notification to the mobile terminal 101 (Step S710). The mobile terminal 101 receives the mail sending completion notification (Step S711).

After Step S710, the mail receiving part 211 of the incoming mail server 106 deletes from the volatile memory part 220 the mail (mail data) sent to the data store server 108 (Step S712).

FIG. 8A and FIG. 8B are sequence diagrams for illustrating an example of mail sending processing of the first embodiment.

First, the data store server I/F 312 of the outgoing mail server 107 sends a mail getting request to the data store server 108 (Step S801). The mail getting request includes a key for identifying mail.

The data store management part 410 of the data store server 108 receives the mail getting request (Step S802), and searches the volatile memory part 430 for given mail (the mail data 431) as requested by the mail getting request (Step S803). After finding the mail (the mail data 431), the data store management part 410 of the data store server 108 sends the getting completion notification and the mail to the outgoing mail server 107 (Step S804).

The data store server I/F 312 of the outgoing mail server 107 receives the getting completion notification and the found mail (Step S805), and stores the received mail in the volatile memory part 320 (Step S806). After the received mail is stored in the volatile memory part 320, the mail sending part 311 of the outgoing mail server 107 sends this mail to the destination server 105 (Step S807).

The destination server 105 receives the mail sent from the outgoing mail server 107 (Step S808), and sends a mail sending completion notification to the outgoing mail server 107 (Step S809).

The mail sending part 311 of the outgoing mail server 107 receives the mail sending completion notification from the destination server 105 (Step S810). The log output part 313 of the outgoing mail server 107 outputs a sending log in a data format that includes information for identifying the mail that has been sent to the destination server 105 (Step S811). The output sending log is stored in the sending log data 331 of the non-volatile memory part 330.

The log output part 313 of the outgoing mail server 107 next deletes from the volatile memory part 320 the mail (mail data) sent to the destination server 105 (Step S812). The data store server I/F 312 of the outgoing mail server 107 sends a mail deleting request to the data store server 108 (Step S813).

The data store management part 410 of the data store server 108 receives the mail deleting request (Step S814), deletes the mail (the mail data 431) from the volatile memory part 430 (Step S815), and sends a deletion completion notification to the outgoing mail server 107 (Step S816).

The data store server I/F 312 of the outgoing mail server 107 receives the deletion completion notification sent from the data store server 108 (Step S817).

Figure 9:
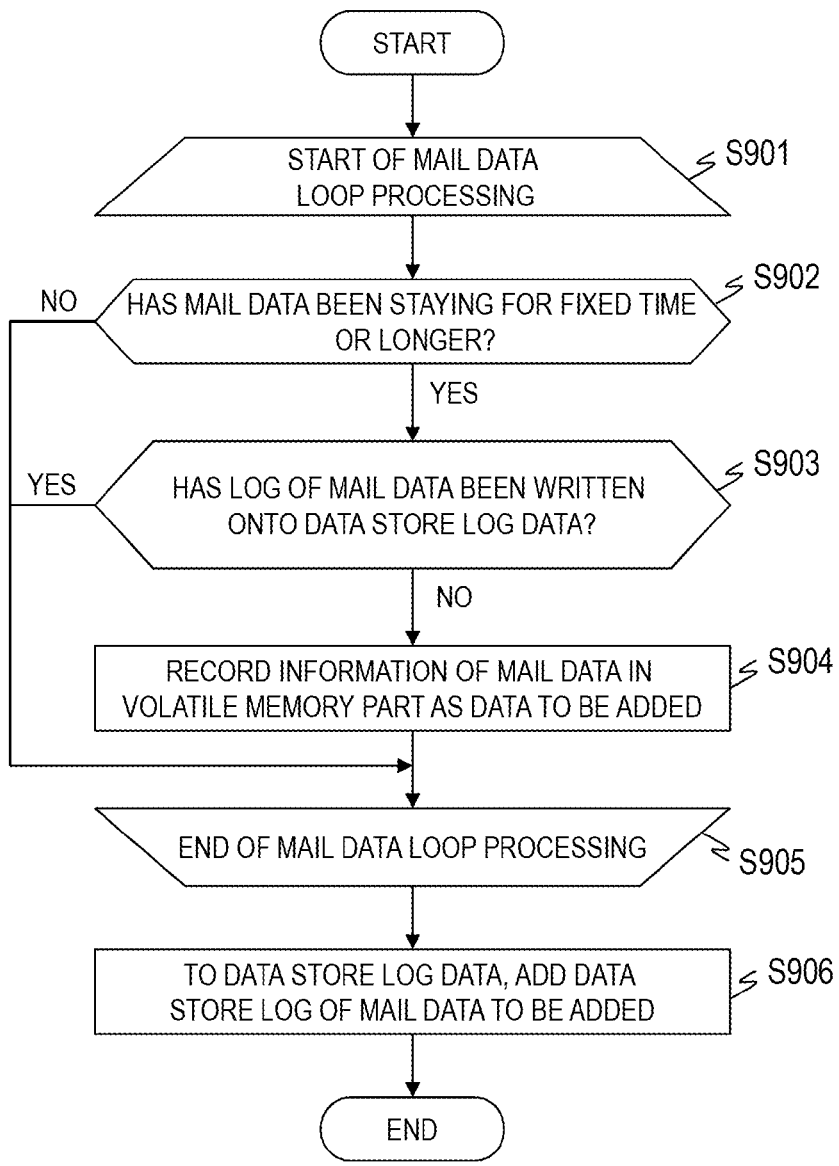
FIG. 9 is a flow chart for illustrating mail data search processing that is executed by a data search processing part of the data store server in the first embodiment.

FIG. 9 is a flow chart for illustrating mail data search processing that is executed by the data search processing part 420 of the data store server 108 in the first embodiment.

In the mail data search processing, mail data stored in the volatile memory part 430 is searched for a given piece of data.

The data search processing part 420 executes processing described below periodically or when a given condition is fulfilled, such as when an instruction from an operator is received.

The data search part 421 of the data search processing part 420 starts loop processing for the mail data 431 stored in the volatile memory part 430 (Step S901).

Specifically, at the time the processing is started, the data search part 421 selects one piece of the mail data 431 to be processed out of the mail data 431 stored in the volatile memory part 430, and executes Steps S902 to S904 for the selected piece of the mail data 431. Steps S902 to S904 are therefore executed repeatedly in the loop processing for the mail data 431 to process each of a plurality of pieces of the mail data 431 stored in the volatile memory part 430.

The data search part 421 determines whether or not the piece of the mail data 431 to be processed has been staying for a fixed length of time or longer (Step S902). Specifically, the following processing is executed.

The data search part 421 calculates a staying time of the mail data 431 by using the current time and time and date information that is included in the mail data 431 to be processed.

For example, the staying time can be calculated as a difference between the time at which the processing is started and the sending time and date of the mail. The time and date information on the mail data 431 is included in a key so that the difference between the current time and the time included in the key can be calculated.

The data search part 421 determines whether or not the calculated staying time is equal to or more than a fixed length of time. In the case where the calculated staying time is equal to or more than the fixed length of time, the data search part 421 determines that the mail data 431 to be processed has been staying for the fixed length of time or longer. The fixed length of time can be set to suit system requirements.

The fixed length of time is also referred to as first time range in the following description.

Step S902 has now been described.

In a case of determining that the mail data to be processed has not stayed for the fixed length of time or longer, the data search part 421 proceeds to Step S905.

In a case of determining that the mail data to be processed has been staying for the fixed length of time or longer, the data search part 421 determines whether or not a data store log of the mail data 431 to be processed has been written onto the data store log data 441 (Step S903).

For example, in the case where a unique ID included in the key of the mail data 431 is utilized as a part of information on a data store log, the data search part 421 can use the unique ID included in the key to search the data store log data 441 for a data store log of the mail data 431 to be processed.

In a case of determining that a data store log of the mail data 431 to be processed has been written onto the data store log data 441, the data search part 421 proceeds to Step S905.

In a case of determining that a data store log of the mail data 431 to be processed has not been written onto the data store log data 441, the data search part 421 stores information on the mail data 431 to be processed in the volatile memory part 430 as data to be added to the data store log data 441 (Step S904).

For example, the data search part 421 records in the volatile memory part 430 the key of the mail data 431 to be added. In the case where there are a plurality of pieces of the mail data 431 to be added, the data search part 421 may generate a list of the keys of the pieces of the mail data 431 to be added, and store the list in the volatile memory part 430.

The data search part 421 next determines whether or not every piece of the mail data 431 stored in the volatile memory part 430 has been processed (Step S905).

In a case of determining that not every piece of the mail data 431 stored in the volatile memory part 430 has been processed, i.e., that there is at least a piece of the mail data 431 remain to be processed, the data search part 421 returns to Step S902 to select a new piece of the mail data 431 and executes Steps S902 to S904.

In a case where it is determined that every piece of the mail data 431 stored in the volatile memory part 430 has been processed, the log output part 422 of the data search processing part 420 adds, to the data store log data 441 of the non-volatile memory part 440, based on the information on the mail data 431 that is recorded in the volatile memory part 430, the data store log of the mail data 431 to be added (Step S906), and ends the whole processing.

The log output part 422 in this embodiment writes a data store log that includes time and date and a unique ID in the data store log data 441.

In this embodiment, writing processing is executed for all data store logs at once after the loop processing is ended, instead of executing writing processing for a data store log of a piece of the mail data 431 to be added each time a selected piece of the mail data 431 is processed by the loop processing. A delay in data store processing due to writing processing is prevented in this manner.

Figure 10:
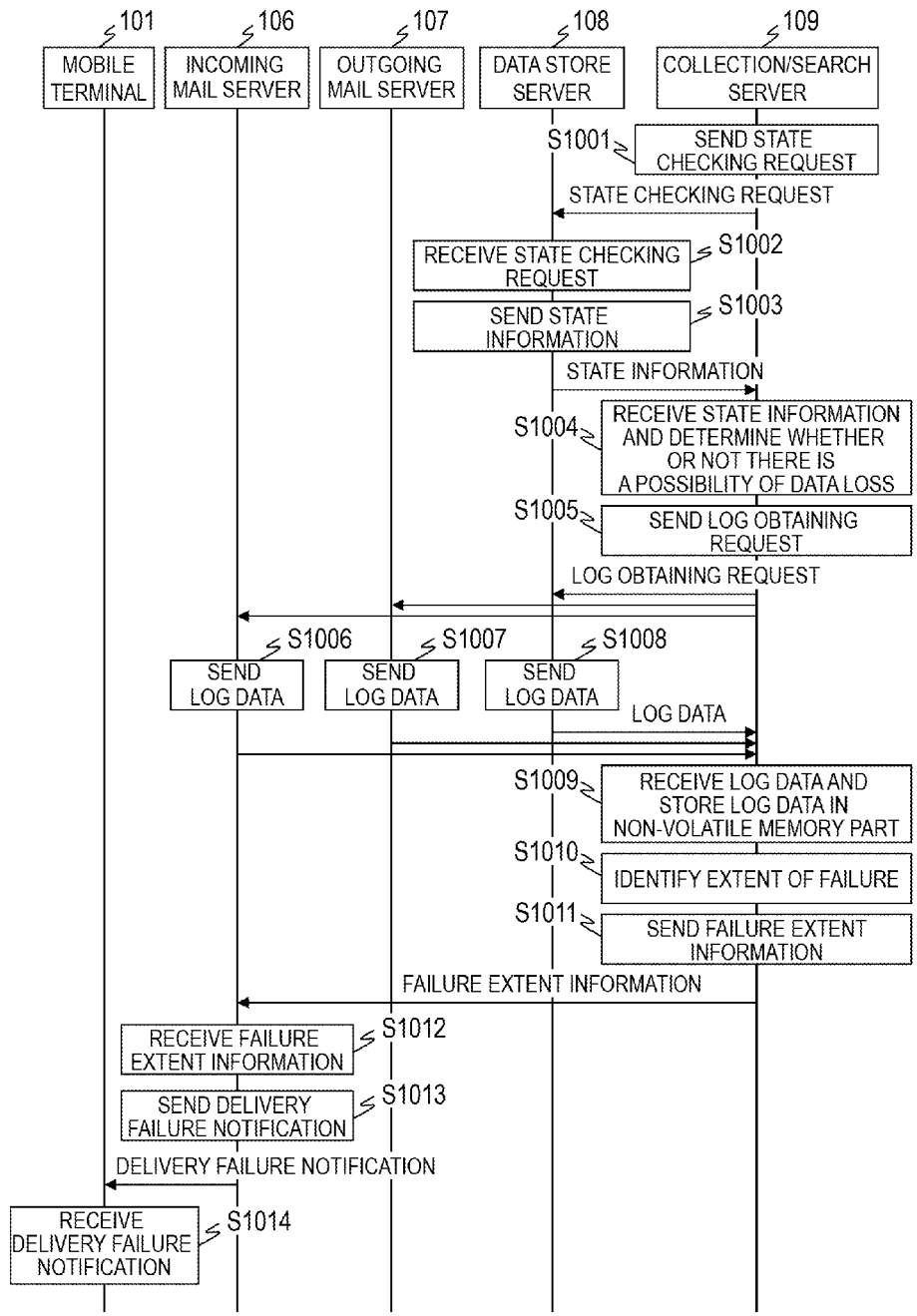
FIG. 10 is a sequence diagram for illustrating processing that is executed when a failure occurs on the data store server in the first embodiment.

FIG. 10 is a sequence diagram for illustrating processing that is executed when a failure occurs on the data store server 108 in the first embodiment. FIG. 11 is an explanatory diagram for illustrating log data that is used by the collection/search server 109 to identify the extent of a failure in the first embodiment.

The failure monitoring part 510 of the collection/search server 109 sends a state checking request to the data store server 108 (Step S1001). The failure monitoring part 510 may send a state checking request periodically or when an instruction from the operator is received.

Step S1001 is processing for detecting a failure in the data store server 108. In a case where a failure in the data store server 108 is detected, the collection/search server 109 checks the chance of a loss of the mail data 431 stored in the volatile memory part 430 of the data store server 108.

The data store management part 410 of the data store server 108 receives the state checking request (Step S1002), checks the running state and the like of the data store server 108, and sends the result of the checking as state information to the collection/search server 109 (Step S1003).

The state information can be any kind of information as long as whether or not there is a chance of loss of the mail data 431 can be determined. For example, in the case where the mail system includes a plurality of data store servers 108, the state information can be configuration information on the plurality of data store servers 108 and the dead/alive information on each data store server 108.

Next, the failure monitoring part 510 of the collection/search server 109 receives the state information and, based on the state information, determines whether or not there is a possibility of loss of the mail data 431 (Step S1004). For example, in the case where two or more data store servers 108 are shut down, the collection/search server 109 determines that a loss of the mail data 431 is likely.

In a case where it is determined that a loss of the mail data 431 is unlikely, there is no need to identify the extent of a failure, and the collection/search server 109 accordingly ends the processing without executing the subsequent steps.

In a case where it is determined that there is a loss of the mail data 431, the log collecting part 520 of the collection/search server 109 sends a log obtaining request to the incoming mail server 106, the outgoing mail server 107, and the data store server 108 (Step S1005). In the case where the OS running on the incoming mail server 106 is a UNIX-based OS, for example, Step S1005 is accomplished by using the scp command or the like.

The incoming mail server 106, the outgoing mail server 107, and the data store server 108 separately send log data to the collection/search server 109 (Steps S1006, S1007, and S1008).

The log collecting part 520 of the collection/search server 109 receives the pieces of log data sent from the respective servers, and stores the received log data in the non-volatile memory part 550 (Step S1009). The log data received from the incoming mail server 106 is stored as the receiving log data 551, the log data received from the outgoing mail server 107 is stored as the sending log data 552, and the log data received from the data store server 108 is stored as the data store log data 553.

The failure extent searching part 530 of the collection/search server 109 uses the received log data to identify the extent of the failure (Step S1010). A method of identifying the extent of a failure is described with reference to FIG. 11.

As described with reference to FIG. 9, only logs of pieces of the mail data 431 that have been staying in the mail system for a fixed length of time (the first time range) or longer are stored in the data store log data 441 in the mail search processing. More specifically, only data store logs of pieces of the mail data 431 that precede the processing start time (the current time) by the first time range or more are stored.

Therefore, in the case where the processing of FIG. 9 and the processing of FIG. 10 are executed in parallel, the data store log data 553 is as illustrated in FIG. 11. The number of logs stored in the data store log data 553 is also much smaller than the number of logs stored in the receiving log data 551 or the sending log data 552.

The extent of a failure can be identified quickly in this embodiment based on the described features of the data store log data 553.

The failure extent searching part 530 first extracts from the receiving log data 551 logs in a period between the current time and a time point that precedes the current time by the first time range. The failure extent searching part 530 also extracts from the sending log data 552 logs in the period between the current time and the time point that precedes the current time by the first time range.

The time point that precedes the current time by the first time range may be referred to as first time point in the following description.

In the example of FIG. 11, logs in the hatched portion of the receiving log data 551 and logs in the hatched portion of the sending log data 552 are extracted.

The failure extent searching part 530 next extracts from the sending log data 552 logs in a period between the first time point and a time point that precedes the first time point by a length of time in which an extent of failure is to be identified. The failure extent searching part 530 also extracts from the data store log data 553 logs in the period between the first time point and the time point that precedes the first time point by the length of time in which an extent of failure is to be identified.

The length of time in which a extent of failure is to be identified may be referred to as second time range and the time point that precedes the first time point by the second time range may be referred to as second time point in the following description. The second time point (the length of time in which the extent of a failure is to be identified) can be set to suit system requirements.

In the example of FIG. 11, logs in the blackened portion of the sending log data 552 and logs in the blackened portion of the data store log data 553 are extracted.

There are no duplicates between logs in the hatched portions and the logs in the blackened portions as illustrated in FIG. 11. This is because logs of the mail data 431 in the range from the current time to the first time point are not output.

The processing of extracting the logs may be executed in a case where logs are stored in Step S1009.

The failure extent searching part 530 compares the receiving logs in the period between the current time and the first time point with the sending logs in the period between the current time and the first time point to search for receiving logs that are not included in the sending log data 552. For example, the failure extent searching part 530 can compare a unique ID in a receiving log with a unique ID in a sending log.

The failure extent searching part 530 also compares the sending logs in the period between the first time point and the second time point with the data store logs in the period between the first time point and the second time point to search for data store logs that are not included in the sending logs. For example, the failure extent searching part 530 can compare a unique ID in a sending log with a unique ID in a data store log.

The extent of a failure such as the number of pieces of the mail data 431 lost and the number of people affected by the loss of mail data is identified through the processing described above. In other words, because a log found by the search includes the sender address and the subject of the mail as illustrated in FIG. 6A, FIG. 6B, and FIG. 6C, the failure extent searching part 530 can notify information about the extent of a failure based on information that is included in the found log.

Step S1010 has now been described.

Next, the failure extent searching part 530 of the collection/search server 109 sends information about the identified extent of the failure as failure extent information to the incoming mail server 106 (Step S1011). For example, the found logs themselves can be sent as the failure extent information.

The mail receiving part 211 of the incoming mail server 106 receives the failure extent information sent from the collection/search server 109 (Step S1012), generates a delivery failure notification to be sent to the mobile terminal 101, and sends the generated delivery failure notification to the mobile terminal 101 (Step S1013). For example, a list that associates the address of a sender with the subject of mail can be sent as the delivery failure notification.

The mobile terminal 101 receives the delivery failure notification sent from the incoming mail server 106 (Step S1014). This informs the sender of the mail who is the owner of the mobile terminal 101 that the mail sent by the sender has failed to reach the destination apparatus.

While the incoming mail server 106 deals with a failure by sending a delivery failure notification in the processing described above, this embodiment is not limited thereto.

For example, in the case where the body of lost mail has been output as a log, the failure extent searching part 530 may output in Step S1011 the found log and information about processing for dealing with a failure, restore the mail (mail data) based on the output information about processing for dealing with a failure, and send the restored mail to the destination server 105.

To accomplish the processing described above, the collection/search server 109 sends failure extent information that includes the restored mail to the outgoing mail server 107, and the outgoing mail server 107 resends the lost mail to the destination server 105.

Examples of the processing for dealing with a failure include "sending a delivery failure notification to the mobile terminal" and "restoring mail data and sending the mail data to the destination server".

The collection/search server 109 in the processing described above automatically identifies the extent of a failure (Step S1010) and sends failure extent information (Step S1011). However, this embodiment is not limited thereto, and processing based on the operator's operation may be executed instead.

FIG. 12 is an explanatory diagram for illustrating an example of a terminal screen, which is used by the operator to operate the collection/search server 109 of the first embodiment.

A terminal screen 1201 is operated when Steps S1010 and S1011 of FIG. 10 are executed. The terminal screen 1201 is a screen that is displayed by a terminal program installed as standard in a common information processing apparatus.

The operator can obtain a differential between logs of different types by, for example, entering the DIFF command of the UNIX. The failure extent searching part 530 receives a given command to execute processing that resembles Step S1010, and displays the result of the processing on the terminal screen.

The operator can also send failure extent information to the incoming mail server 106 by operating the collection/search server 109 so that a log found through a search with the use of the DIFF command is input to the failure extent searching part 530.

As described above, according to the first embodiment, only logs of pieces of mail that fulfill a given condition are written in the non-volatile memory part 440 on the data store server 108. This makes the number of logs that are written smaller than in the related art, and a drop in the performance of data store such as in-memory KVS is accordingly prevented.

In addition, the failure extent searching part 530 can identify the extent of a failure by comparing pieces of receiving log data and pieces of sending log data that are within a given time range, and comparing pieces of sending log data and pieces of data store log data that are within another given time range.

Unlike the related art where the amount of receiving log data and sending log data to be compared is huge, this embodiment is capable of identifying the extent of a failure quickly by comparing pieces of data within a limited time range. Storing only logs of pieces of mail data that fulfill a given condition in the data store log also speeds up the comparison processing described above.

Modification Example

While a piece of the mail data 431 that is to be added to the data store log data 441 is identified based on the length of time for which the mail has been staying in the mail system in the first embodiment, the first embodiment is not limited thereto. For instance, a piece of the mail data 431 that is to be added to the data store log data 441 may be identified based on the processing described below.

Figure 13:
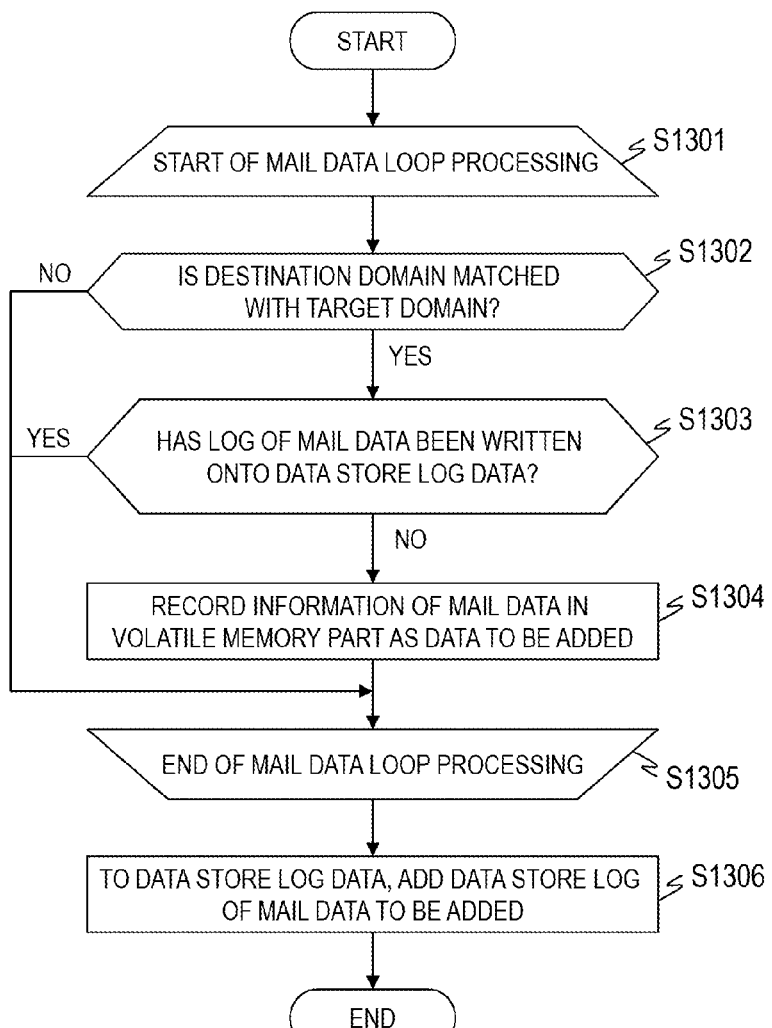
FIG. 13 is a flow chart for illustrating mail data search processing that is executed by the data search processing part of the data store server in a modification example of the first embodiment.

FIG. 13 is a flow chart for illustrating mail data search processing that is executed by the data search processing part 420 of the data store server 108 in a modification example of the first embodiment.

In Modification Example 1, the data search part 421 determines whether or not the destination domain of a piece of the mail data 431 to be processed is matched with a target domain (Step S1302). The target domain is set in advance.

For example, in the case where a domain name included in the key of the mail data 431 is utilized as a part of information on a data store log, the data search part 421 determines whether or not the target domain is the destination domain of a piece of the mail data 431 to be processed based on the domain name included in the key.

Steps S1301, S1303, S1304, S1305, and S1306 are the same as Steps S901, S903, S904, S905, and S906, respectively, and a description thereof is therefore omitted.

Fast failure extent identification focused on a particular domain is accomplished by executing the data search processing of FIG. 13.

Second Embodiment

A mail system according to a second embodiment of this invention includes a plurality of carrier networks. In a case where a failure occurs in one of the plurality of carrier networks, the collection/search server 109 in another of the plurality of carrier networks identifies the extent of the failure.

The second embodiment is described below by focusing on differences from the first embodiment.

Figure 14:
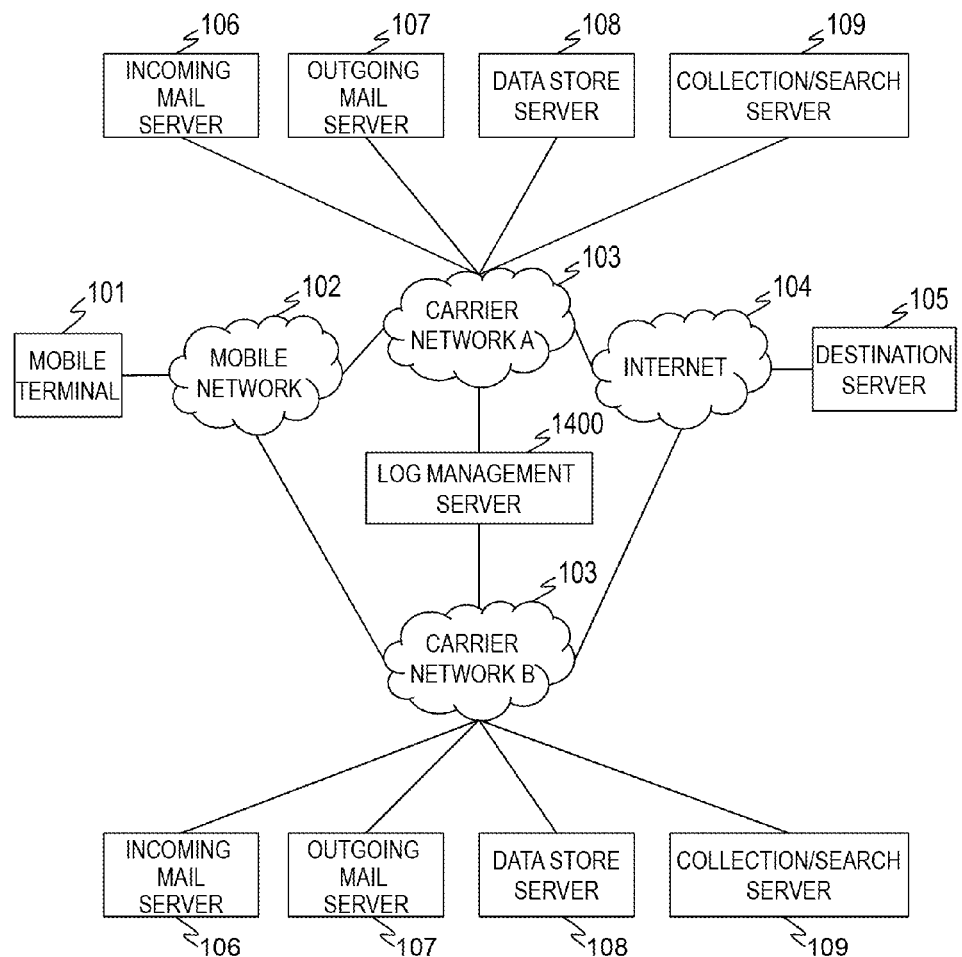
FIG. 14 is an explanatory diagram for illustrating an example of the configuration of a mail system according to a second embodiment.

FIG. 14 is an explanatory diagram for illustrating an example of the configuration of a mail system according to the second embodiment.

The mail system of the second embodiment includes two carrier networks 103, one of which is a carrier network A and the other of which is a carrier network B. The mail system of the second embodiment also includes a log management server 1400. The log management server 1400 is coupled to the carrier network A 103 and the carrier network B 103 to manage logs for each carrier network 103 separately.

To each of the carrier network A 103 and the carrier network B 103, the incoming mail server 106, the outgoing mail server 107, the data store server 108, and the collection/search server 109 are coupled.

The mobile terminal 101 of the second embodiment is coupled to the carrier network A 103 and the carrier network B 103 via the mobile network 102.

The destination server 105 of the second embodiment is coupled to the carrier network A 103 and the carrier network B 103 via the internet 104. The destination server 105 of the second embodiment sends/receives mail to/from the outgoing mail server 107 that is coupled to the carrier network A 103, and sends/receives mail to/from the outgoing mail server 107 that is coupled to the carrier network B 103.

The incoming mail server 106, the outgoing mail server 107, the data store server 108, and the collection/search server 109 in this embodiment are the same as those in the first embodiment, and a description on the configurations of the respective servers is therefore omitted here.

Figure 15:
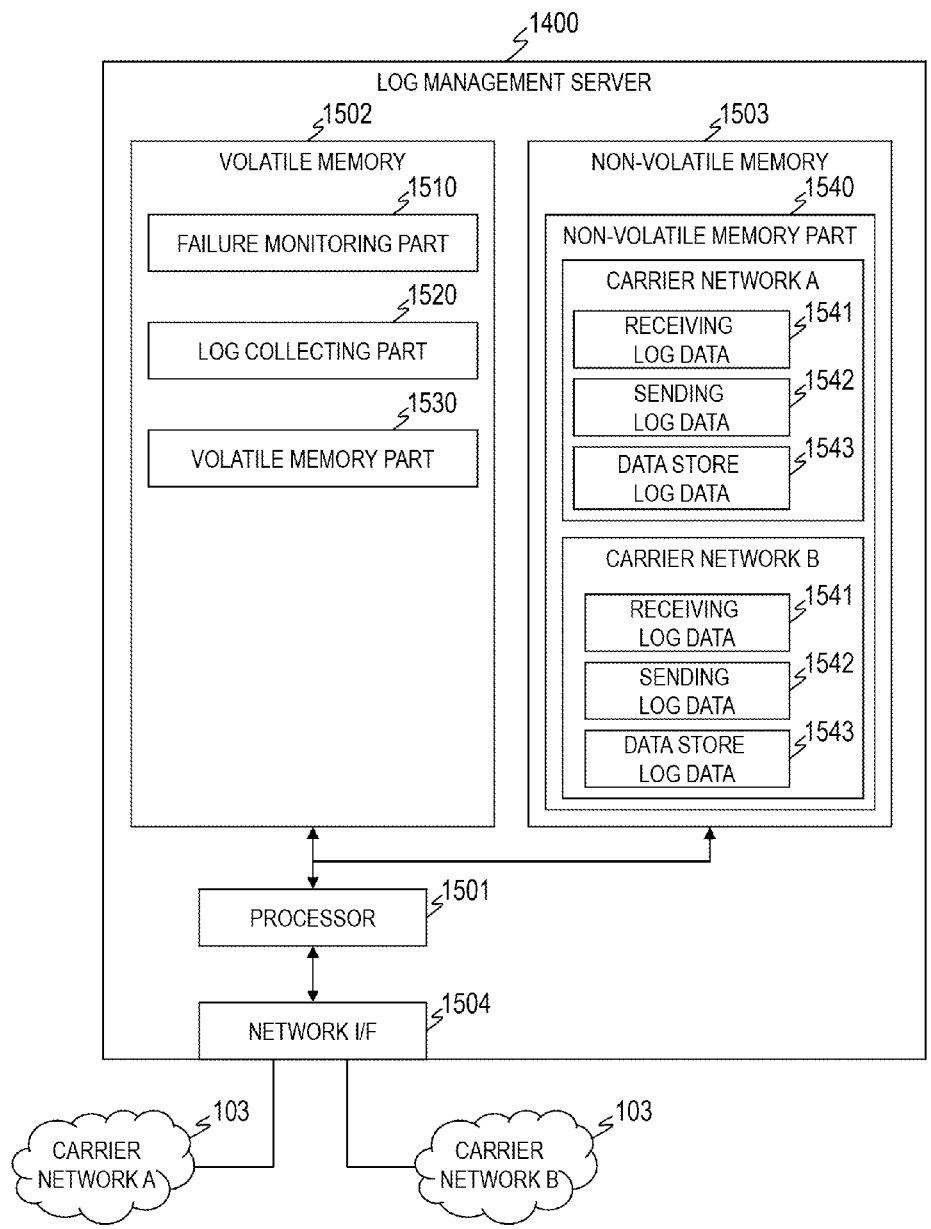
FIG. 15 is a block diagram for illustrating an example of the configuration of a log management server in the second embodiment.

FIG. 15 is a block diagram for illustrating an example of the configuration of the log management server 1400 in the second embodiment.

The log management server 1400 is implemented with the use of an information processing apparatus. The hardware configuration of the log management server 1400 includes a processor 1501, a volatile memory 1502, a non-volatile memory 1503, and a network I/F 1504, which are coupled to one another via an internal communication line such as a bus.

The processor 1501 executes a program stored in the volatile memory 1502. By executing a program that is stored in the volatile memory 1502 with the use of the processor 1501, the function of the log management server 1400 is implemented. In the following description, a program described as performing processing is actually being executed by the processor 1501.

The volatile memory 1502 stores programs executed by the processor 1501, and includes a storage area in which data necessary to execute the programs is temporarily stored. Specifically, the volatile memory 1502 stores programs that implement a failure monitoring part 1510 and a log collecting part 1520, and includes a volatile memory part 1530.

The failure monitoring part 1510 executes processing for monitoring each carrier network 103 for a failure.

The log collecting part 1520 executes processing for obtaining a log from the collection/search server 109 of each carrier network 103 and storing the obtained log in the non-volatile memory 1503. The log collecting part 1520 in this embodiment stores, for each carrier network 103 separately, receiving log data 1541, sending log data 1542, and data store log data 1543 in a non-volatile memory part 1540.

The volatile memory part 1530 stores data that is managed by the failure monitoring part 1510 and the log collecting part 1520.

The non-volatile memory 1503 includes the non-volatile memory part 1540 in which data is stored permanently.

The non-volatile memory part 1540 stores data that is managed by the failure monitoring part 1510 and the log collecting part 1520. The non-volatile memory part 1540 also stores, for each carrier network 103 separately, the receiving log data 1541, the sending log data 1542, and the data store log data 1543.

The receiving log data 1541, the sending log data 1542, and the data store log data 1543 are the same as the receiving log data 551, the sending log data 552, and the data store log data 553.

The network I/F 1504 is an interface for coupling to other apparatus via a network. The network I/F 1504 in this embodiment is coupled to the carrier network A 103 and the carrier network B 103.

Figure 16:
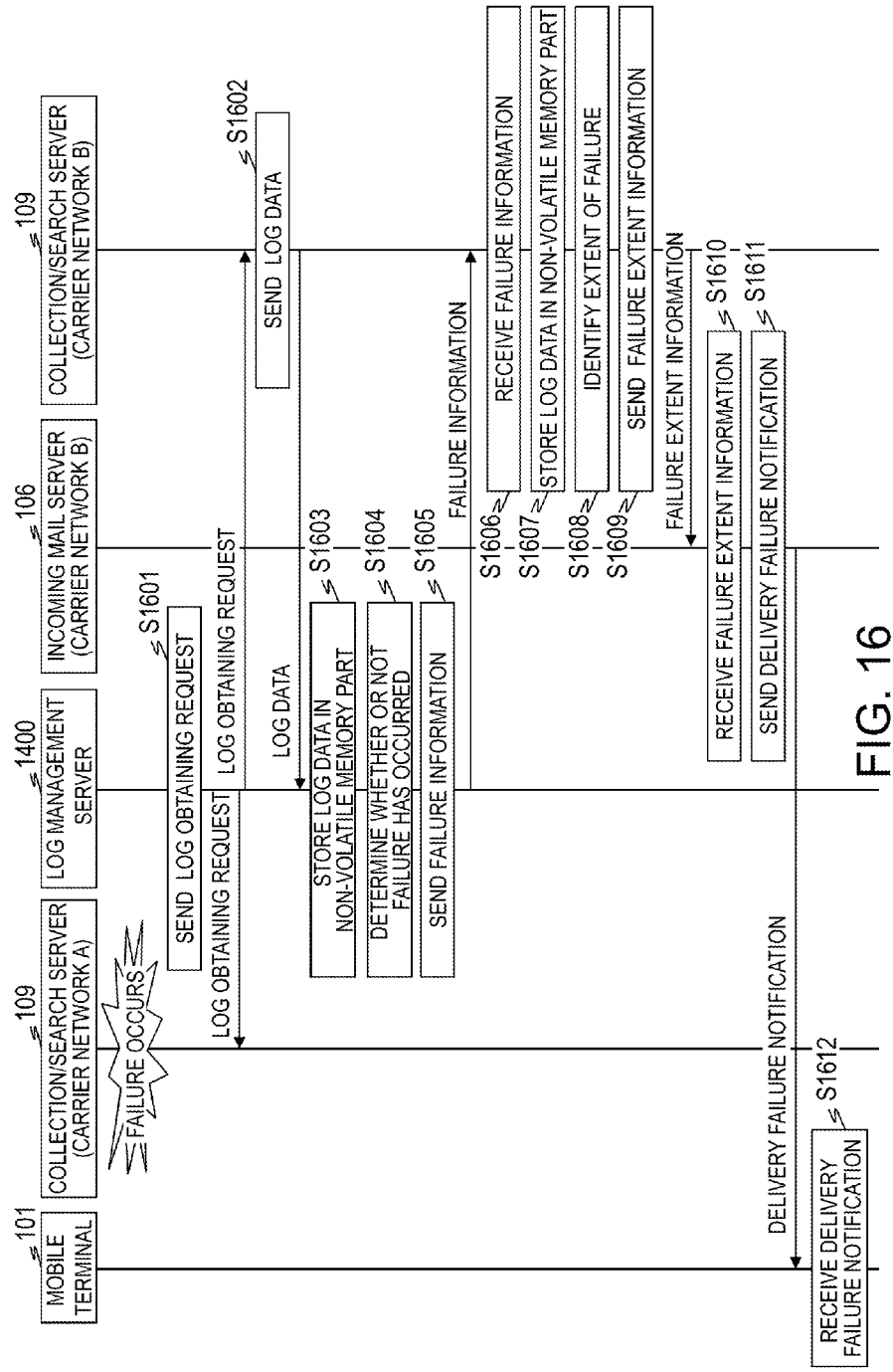
FIG. 16 is a sequence diagram for illustrating processing that is executed in the second embodiment when a failure occurs in one of carrier networks.

FIG. 16 is a sequence diagram for illustrating processing that is executed in the second embodiment when a failure occurs in one of the carrier networks.

In the following description, the carrier network in which a failure has occurred is the carrier network A 103.

The log collecting part 1520 of the log management server 1400 sends a log obtaining request to the collection/search server 109 of each of the carrier network A 103 and the carrier network B 103 (Step S1601). For example, the log management server 1400 sends a log obtaining request by broadcast. The log collecting part 1520 may send a log obtaining request periodically or may send a log obtaining request when an instruction from an operator is received.

The log collecting part 520 of the collection/search server 109 of the carrier network B 103 receives the log obtaining request and sends to the log management server 1400 the receiving log data 551, the sending log data 552, and the data store log data 553, which are stored in the non-volatile memory part 550 (Step S1602).

The log collecting part 520 may obtain the log data by sending a log obtaining request to the incoming mail server 106, the outgoing mail server 107, and the data store server 108 that are coupled to the carrier network B 103.

The log collecting part 1520 of the log management server 1400 receives the log data and stores the received data in the non-volatile memory part 1540 as log data of the carrier network B (Step S1603). For example, the log collecting part 1520 stores the log data in the non-volatile memory part 1540 in association with the identifier of the carrier network B.

The failure monitoring part 1510 of the log management server 1400 determines for each carrier network 103 whether or not a failure has occurred in the carrier network 103, based on the carrier network's response to the log obtaining request (Step S1604).

For example, in the case where log data is not sent from the collection/search server 109 within a fixed length of time after the sending of the log obtaining request, the failure monitoring part 1510 determines that a failure has occurred in the carrier network 103 to which this collection/search server 109 is coupled.

The failure monitoring part 1510 in this embodiment determines that a failure has occurred in the carrier network A 103 because the collection/search server 109 of the carrier network A 103 fails to send log data.

In a case where a failure is detected in one of the carrier networks 103, the failure monitoring part 1510 of the log management server 1400 sends failure information to the collection/search server 109 of the other carrier network 103 (Step S1605).

The failure information includes identification information on the carrier network 103 in which a failure has been detected and log data of the carrier network 103. For example, the failure monitoring part 1510 uses identification information on the carrier network 103 in which a failure has been detected to obtain from the non-volatile memory part 1540 log data that is associated with this carrier network 103.

The log collecting part 520 of the collection/search server 109 receives the failure information (Step S1606), and stores the log data included in the failure information in the non-volatile memory part 550 in association with the identification information on the carrier network 103 (Step S1607).

The failure extent searching part 530 of the collection/search server 109 uses the log data stored in the non-volatile memory part 550 to identify the extent of the failure (Step S1608). Step S1608 is the same as Step S1010, and a description thereof is therefore omitted.

The failure extent searching part 530 of the collection/search server 109 next sends information about the identified failure extent to the incoming mail server 106 as failure extent information (Step S1609). Step S1609 is the same as Step S1011, and a description thereof is therefore omitted.

The mail receiving part 211 of the incoming mail server 106 receives the failure extent information sent from the collection/search server 109 (Step S1610), generates a delivery failure notification to be sent to the mobile terminal 101, and sends the generated delivery failure notification to the mobile terminal 101 (Step S1611). Steps S1610 and S1611 are the same as Steps S1012 and S1013, respectively, and a description thereof is therefore omitted.

The mobile terminal 101 receives the delivery failure notification sent from the incoming mail server 106 (Step S1612). This informs the sender of the mail who is the owner of the mobile terminal 101 that the mail sent by the sender has failed to reach the destination. Step S1612 is the same as Step S1014.

While the incoming mail server 106 deals with a failure by sending a delivery failure notification in the processing described above, this embodiment is not limited thereto.

For example, in the case where the body of lost mail has been output as a log, the log collecting part 1520 may output in Step S1609 the found log and information about processing for dealing with a failure, restore the mail (mail data) based on the output information about processing for dealing with a failure, and send the restored mail to the destination server 105.

To accomplish the processing described above, the collection/search server 109 sends failure extent information that includes the restored mail to the outgoing mail server 107, and the outgoing mail server 107 resends the lost mail to the destination server 105.

Examples of the processing for dealing with a failure include "sending a delivery failure notification to the mobile terminal" and "restoring mail data and sending the mail data to the destination server".

While the log management server 1400 sends a log obtaining request to the collection/search server 109 of each carrier network 103 in the processing described above, this embodiment is not limited thereto.

For example, the incoming mail server 106, the outgoing mail server 107, and the data store server 108 may each send logs to the log management server 1400 when outputting logs (Step S709, S811, or S906). The log management server 1400 in this case sends a state checking request, instead of a log obtaining request, to the collection/search server 109.

As described above, according to the second embodiment, the extent of a failure that has occurred throughout one of the carrier networks 103 can be identified by the collection/search server 109 of the other carrier network 103.

Various types of software illustrated in the present embodiment can be stored in various electromagnetic, electronic, and optical recording media and can be downloaded to a computer via a communication network such as the Internet.

Further, in the present embodiment, although an example of using software-based control has been described, part of the control may be realized by hardware.

While the present invention has been described in detail with reference to the accompanying drawings, the present invention is not limited to the specific configuration, and various changes and equivalents can be made within the scope of the claims.

What is claimed is:

1. A computer system, comprising a plurality of computers to be coupled to one another through a network and being configured to receive a plurality of messages from a terminal and send each of the plurality of messages to a destination apparatus, wherein each of the plurality of computers includes a processor, a memory coupled to the processor, and a network interface coupled to the processor, and wherein the computer system comprises:

at least one first computer including a message receiving part configured to receive the plurality of messages from the terminal, a first log output part configured to output a plurality of receiving logs which are logs of the received plurality of messages, and a first memory part configured to store receiving log data including the plurality of receiving logs;

at least one second computer including a data store management part configured to manage a data store which is built from a storage area of the memory of the at least one second computer and stores the plurality of messages, a first search part configured to search for at least one of the plurality of messages that meets a given condition from among the plurality of messages stored in the data store, a second log output part configured to output a data store log which is a log of the searched at least one of the plurality of messages, and a second memory part configured to store data store log data including a plurality of data store logs;

at least one third computer including a message sending part configured to retrieve the plurality of messages stored in the data store and send the plurality of messages to the destination apparatus, a third log output part configured to output a plurality of sending logs which are logs of the plurality of messages sent to the destination apparatus, and a third memory part configured to store sending log data including the plurality of sending logs; and at least one fourth computer including a first monitoring part configured to monitor a state of the data store, a first log collecting part configured to obtain the receiving log data from the first memory part, the data store log data from the second memory part, and the sending log data from the third memory part, respectively, in a case where a failure in the data store is detected, a second search part configured to search for at least one lost message of the plurality of messages, which has been lost due to the failure in the data store, by comparing the obtained receiving log data, data store log data, and sending log data, and a fourth memory part configured to store the receiving log data, the data store log data, and the sending log data.

2. The computer system according to claim 1, wherein the first search part is further configured to:

select a message to be processed out of the plurality of messages stored in the data store;

calculate a staying time of the selected message based on current time and information on time and date included in the selected message;

determine the selected message as data to be output to the data store log in a case where the calculated staying time is greater than a first time range; and generate on the memory of the at least one second computer a list of identification information on each of a plurality of messages to be output, and wherein the second log output part is further configured to:

generate a plurality of data store logs of the plurality of messages to be output based on the list; and add the generated plurality of data store logs to the data store log data that is stored in the second memory part.

3. The computer system according to claim 2, wherein the first monitoring part is further configured to:

obtain state information indicating a running state of the second computer from the second computer;

determine whether any of the plurality of messages have been lost based on the obtained state information;

send a log obtaining request to the first computer, the second computer, and the third computer, in a case of determining that at least one of the plurality of messages has been lost; and store, in the fourth memory part, the receiving log data received from the first computer, the data store log data received from the second computer, and the sending log data received from the third computer, and wherein the second search part is further configured to:

extract the plurality of receiving logs in a period between the current time and a first time point from the obtained receiving log data, the first time point is a time point that precedes the current time by the first time range;

extract a plurality of first sending logs in the period between the current time and the first time point from the obtained sending log data;

extract the plurality of data store logs in a period between the first time point and a second time point from the obtained data store log data, the second time point is a time point that precedes the first time by a second time range;

extract a plurality of second sending logs in the period between the first time point and the second time point from the obtained sending log data;

compare the extracted plurality of receiving logs with the extracted plurality of first sending logs, and further compare the extracted plurality of data store logs with the extracted plurality of second sending logs;

identify any of the plurality of messages which have been lost due to the failure in the data store based on results of the comparisons; and send information about the identified lost messages to the first computer.

4. The computer system according to claim 2, wherein the second log output part is further configured to output, as the data store log, one of a message to be output and a search key which is generated from the message to be output.

5. The computer system according to claim 3, wherein the message receiving part is further configured to:
- generate notification information for at least one of the identified lost messages in a case of receiving the information about the at least one of the identified lost messages from the second search part; and
- send the generated notification information to the terminal.

6. The computer system according to claim 2,
- wherein the computer system further comprises a first network to which the terminal is coupled, a second network to which the destination apparatus is coupled, and a plurality of third networks to which the first network and the second network are coupled,
- wherein the at least one first computer, the at least one second computer, the at least one third computer, and the at least one fourth computer are coupled to each of the plurality of third networks,
- wherein the computer system further comprises a fifth computer including a second monitoring part coupled to the plurality of third networks and configured to monitor each of the plurality of third networks for a failure, a second log collecting part configured to obtain the receiving log data, the data store log data, and the sending log data from each of the plurality of third networks, and a fifth memory part configured to store the obtained receiving log data, data store log data, and sending log data for each of the plurality of third networks separately,
- wherein the second log collecting part is further configured to:
- send a log obtaining request to the at least one fourth computer, each of which is coupled to each of the plurality of third networks; and
- store the received receiving log data, data store log data, and sending log data in the fifth memory part,
- wherein the second monitoring part is further configured to:
- determine whether there is a fourth computer that has not responded to the log obtaining request;
- determine that a failure has occurred in one of the plurality of third networks to which the nonresponsive fourth computer is coupled, in a case where a fourth computer has not responded to the log obtaining request;
- read the receiving log data, the data store log data, and the sending log data that are associated with the failed one of the plurality of third networks out of the fifth memory part; and
- send, to the at least one fourth computer each of which is coupled to another one of the plurality of third networks that is not experiencing a failure, failure information including the read receiving log data, data store log data, and sending log data, and
- wherein, in the case where a failure in one of the plurality of third networks is detected, the second search part is further configured to use the failure information to search for at least one lost message which has been lost in the failed one of the plurality of third networks in a case of receiving the failure information.

7. A method of identifying a failure in a computer system, the computer system including a plurality of computers to be coupled to one another through a network and being configured to receive a plurality of messages from a terminal and send each of the plurality of messages to a destination apparatus,
the plurality of computers each including a processor, a memory coupled to the processor, and a network interface coupled to the processor,
the computer system including:
- at least one first computer including a message receiving part, a first log output part, and a first memory part configured to store receiving log data including a plurality of receiving logs;
- at least one second computer including a data store management part configured to manage a data store which is built from a storage area of the memory of the at least one second computer and stores the plurality of messages, a first search part, a second log output part, and a second memory part configured to store data store log data including a plurality of data store logs;
- at least one third computer including a message sending part, a third log output part, and a third memory part configured to store sending log data including a plurality of sending logs; and
- at least one fourth computer including a first monitoring part, a first log collecting part, a second search part, and a fourth memory part,
the method including:
- a first step of receiving, by the message receiving part, the plurality of messages from the terminal;
- a second step of sending, by the message receiving part, a message storing request including the received plurality of messages to the data store management part;
- a third step of storing, by the data store management part, in the data store, the plurality of messages included in the message storing request;
- a fourth step of adding, by the first log output part, the plurality of receiving logs of the received plurality of messages to the receiving log data of the first memory part after receiving a first notification, which is a response to the message storing request, from the data store management part;
- a fifth step of sending, by the message sending part, a mail getting request to the data store management part;
- a sixth step of receiving, by the message sending part, from the data store management part, a second notification, which is a response to the mail getting request, and a plurality of mails;
- a seventh step of sending, by the message sending part, the received plurality of mails to the destination apparatus;
- an eighth step of adding, by the third log output part, a plurality of sending logs of the retrieved plurality of mails to the sending log data of the third memory part, after receiving a third notification, which informs that the retrieved plurality of mails have been received, is received from the destination apparatus;
- a ninth step of searching, by the first search part, for at least one of the plurality of messages that meets a given condition from among the plurality of messages stored in the data store;
- a tenth step of adding, by the second log output part, a data store log of the searched at least one of the plurality of messages to the data store log data that is stored in the second memory part;
- an eleventh step of monitoring, by the first monitoring part, a state of the data store;
- a twelfth step of obtaining, by the first log collecting part, the receiving log data from the first memory part, the data store log data from the second memory part, and the sending log data from the third memory part, respectively, in a case where a failure in the data store is detected by the first monitoring part;

a thirteenth step of storing, by the first log collecting part, the receiving log data, the data store log data, and the sending log data in the fourth memory part; and a fourteenth step of searching, by the second search part, for at least one lost message of the plurality of messages, which has been lost due to the failure in the data store, by comparing the obtained receiving log data, data store log data, and sending log data.

8. The method of identifying a failure according to claim 7, wherein the ninth step includes the steps of:

selecting a message to be processed out of the plurality of messages stored in the data store;

calculating a staying time of the selected message based on current time and on information on time and date that is comprised in the selected message;

determining the selected message as data to be output to the data store log in a case where the calculated staying time is greater than a first time range; and generating on the memory of the at least one second computer a list of identification information on each of a plurality of the messages to be output, and wherein the tenth step includes the steps of:

generating a plurality of data store logs of the plurality of messages to be output based on the list; and adding the generated plurality of data store logs to the data store log data that is stored in the second memory part.

9. The method of identifying a failure according to claim 8, wherein the eleventh step includes the steps of:

obtaining state information indicating a running state of the second computer from the second computer; and determining whether any of the plurality of messages have been lost based on the obtained state information, wherein the twelfth step includes the steps of:

sending a log obtaining request to the first computer, the second computer, and the third computer, in a case of determining that at least one of the plurality of messages has been lost; and storing, in the fourth memory part, the receiving log data received from the first computer, the data store log data received from the second computer, and the sending log data received from the third computer, and wherein the fourteenth step includes the steps of:

extracting the plurality of receiving logs in a period between the current time and a first time point from the obtained receiving log data, the first time point is a time point that precedes the current time by the first time range;

extracting a plurality of first sending logs in the period between the current time and the first time point from the obtained sending log data;

extracting the plurality of data store logs in a period between the first time point and a second time point from the obtained data store log data, the second time point is a time point that precedes the first time by a second time range;

extracting a plurality of second sending logs in the period between the first time point and the second time point from the obtained sending log data;

comparing the extracted plurality of receiving logs with the extracted plurality of first sending logs, and further comparing the extracted plurality of data store logs with the extracted plurality of second sending logs;

identifying at least one of the plurality of messages which has been lost due to the failure in the data store based on results of the comparisons; and sending information about the identified lost messages to the message receiving part.

10. The method of identifying a failure according to claim 8, wherein the tenth step includes outputting, as a data store logs, one of a message to be output and a search key which is generated from the message to be output.

11. The method of identifying a failure according to claim 9, further including the steps of:

generating, by the message receiving part, notification information for at least one of the identified lost messages in a case of receiving the information about the at least one of the identified lost messages from the second search part; and sending, by the message receiving part, the generated notification information to the terminal.

12. The method of identifying a failure according to claim 8, wherein the computer system further includes a first network to which the terminal is coupled, a second network to which the destination apparatus is coupled, and a plurality of third networks to which the first network and the second network are coupled, wherein the at least one first computer, the at least one second computer, the at least one third computer, and the at least one fourth computer are coupled to each of the plurality of third networks, wherein the computer system further includes a fifth computer including a second monitoring part coupled to the plurality of third networks, a second log collecting part, and a fifth memory part configured to store the receiving log data, the data store log data, and the sending log data for each of the plurality of third networks separately, and wherein the method further includes the steps of:

sending, by the second log collecting part, a log obtaining request to the at least one fourth computer, each of which is coupled to each of the plurality of third networks;

storing, by the second log collecting part, the received receiving log data, data store log data, and sending log data in the fifth memory part;

determining, by the second monitoring part, whether there is a fourth computer that has not responded to the log obtaining request;

determining, by the second monitoring part that a failure has occurred in one of the plurality of third networks to which the nonresponsive fourth computer is coupled, in a case where a fourth computer has not responded to the log obtaining request;

reading, by the second monitoring part, the receiving log data, the data store log data, and the sending log data that are associated with the failed one of the plurality of third networks out of the fifth memory part;

sending, by the second monitoring part, to the at least one fourth computer each of which is coupled to another one of the plurality of third networks that is not experiencing a failure, failure information including the read receiving log data, data store log data, and sending log data; and using, by the second search part, the failure information to search for the at least one lost message in the failed one of the plurality of third networks in a case of receiving the failure information.

13. A computer system, comprising a plurality of servers to be coupled to one another and being configured to receive a plurality of messages from a terminal and send each of the plurality of messages to a destination apparatus, wherein the computer system includes a processor, a memory coupled to the processor, and a network interface coupled to the processor, and wherein the computer system comprises:

an incoming mail server including a message receiving part configured to receive the plurality of messages from the terminal, a first log output part configured to output a plurality of receiving logs which are logs of the received plurality of messages, and a first memory part configured to store receiving log data including the plurality of receiving logs;

a data store server including a data store management part configured to manage a data store which is built from a storage area of the memory and stores the plurality of messages, a first search part configured to search for at least one of the plurality of messages that meets a given condition from among the plurality of messages stored in the data store, a second log output part configured to output a data store log which is a log of the searched at least one of the plurality of messages, and a second memory part configured to store data store log data including a plurality of data store logs;

an outgoing mail server including a message sending part configured to retrieve the plurality of messages stored in the data store and send the plurality of messages to the destination apparatus, a third log output part configured to output a plurality of sending logs which are logs of the plurality of messages sent to the destination apparatus, and a third memory part configured to store sending log data including the plurality of sending logs; and a collection/search server including a first monitoring part configured to monitor a state of the data store, a first log collecting part configured to obtain the receiving log data from the first memory part, the data store log data from the second memory part, and the sending log data from the third memory part, respectively, in a case where a failure in the data store is detected, a second search part configured to search for at least one lost message of the plurality of messages, which has been lost due to the failure in the data store, by comparing the obtained receiving log data, data store log data, and sending log data, and a fourth memory part configured to store the receiving log data, the data store log data, and the sending log data, wherein the incoming mail server, the data store server, the outgoing mail server, and the collection/search server are implemented with computer resources of the same computer.

14. The computer system according to claim 13, wherein the incoming mail server, the data store server, the outgoing mail server, and the collection/search server are implemented virtually.

* * * * *